US 9,154,861 B2
*Oct. 6, 2015

(12) United States Patent
Zheng

(10) Patent No.: US 9,154,861 B2
(45) Date of Patent: *Oct. 6, 2015

(54) METHOD, SYSTEM AND OPTICAL NETWORK DEVICE FOR SYNCHRONIZING TIME OF A PASSIVE OPTICAL NETWORK

(71) Applicant: Huawei Technologies Co., Ltd., Shenzhen, Guangdong (CN)

(72) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

This patent is subject to a terminal disclaimer.

(21) Appl. No.: 14/039,213

(22) Filed: Sep. 27, 2013

(65) Prior Publication Data

US 2014/0023369 A1   Jan. 23, 2014

Related U.S. Application Data

(63) Continuation of application No. 12/942,196, filed on Nov. 9, 2010, now Pat. No. 8,570,874, which is a continuation of application No. PCT/CN2009/071598, filed on Apr. 30, 2009.

(30) Foreign Application Priority Data

May 9, 2008  (CN) .......................... 2008 1 0096171

(51) Int. Cl.
*H04L 12/26*  (2006.01)
*H04J 3/06*   (2006.01)
*H04L 7/00*   (2006.01)
*H04B 10/00*  (2013.01)
*H04Q 11/00*  (2006.01)

(52) U.S. Cl.
CPC .......... *H04Q 11/0067* (2013.01); *H04J 3/0697* (2013.01); *H04J 3/0667* (2013.01); *H04Q 11/0066* (2013.01); *H04Q 2011/0079* (2013.01); *H04Q 2011/0088* (2013.01)

(58) Field of Classification Search
CPC .................... H04Q 11/0066; H04Q 11/00677; H04Q 2011/0088; H04Q 2011/0079; H04Q 2011/0045; H04Q 2213/1301; H04Q 11/00; H04Q 11/0001; H04Q 11/0005; H04Q 11/0067; H04Q 11/0071; H04Q 2011/0064; H04Q 2011/0066; H04Q 2011/0083; H04Q 2213/13292; H04B 10/0773; H04B 10/27; H04B 10/272; H04L 7/0008; H04L 7/0337; H04L 7/06; H04L 27/2096; H04L 27/2613; H04L 27/2655; H04L 5/0023; G06F 1/14; H04J 3/0652; H04J 3/0667; H04J 3/0685; H04J 3/0694; H04J 3/0697; H04J 3/14; H04J 3/1617; H04J 14/005; H04J 14/021; H04J 14/0221; H04J 14/0227; H04J 14/0254; H04J 14/0256; H04J 14/026; H04J 14/0267; H04J 14/0273; H04J 14/0275; H04J 14/0279; H04J 14/028; H04J 2203/0032; H04J 2203/0058; H04J 2203/0066; H04J 3/06; H04J 3/0608; H04J 3/0647; H04J 3/0655; H04J 3/0658; H04J 3/0673; H04J 3/0682; H04J 3/1694; H04J 14/02; H04J 14/0232; H04J 14/0234; H04J 14/0239; H04J 14/0246–14/0247; H04J 14/025; H04J 14/0252; H04J 14/0282; H04J 14/08; H04J 14/086; H04J 2014/0253; H04N 21/242; H04N 21/4305
USPC ...................... 370/236–236.2, 503, 509–514; 375/354–370; 398/154–156; 709/248
See application file for complete search history.

(56) References Cited

U.S. PATENT DOCUMENTS

| | | | | |
|---|---|---|---|---|
| 7,260,119 | B2 * | 8/2007 | Sala et al. ..................... | 370/510 |
| 7,376,136 | B2 | 5/2008 | Song et al. | |
| 7,555,015 | B2 * | 6/2009 | Dudziak et al. .............. | 370/509 |
| 7,917,032 | B2 * | 3/2011 | Mori .............................. | 398/72 |
| 7,920,791 | B2 * | 4/2011 | Sakai et al. .................... | 398/66 |
| 7,925,162 | B2 | 4/2011 | Soto et al. | |
| 8,018,954 | B2 * | 9/2011 | Jamieson et al. ............. | 370/401 |

| | | | |
|---|---|---|---|
| 8,098,678 B2* | 1/2012 | Endo et al. | 370/420 |
| 8,208,851 B2* | 6/2012 | Kwak et al. | 455/13.1 |
| 8,223,648 B2* | 7/2012 | Zheng | 370/236.2 |
| 8,331,784 B2* | 12/2012 | Mizutani et al. | 398/70 |
| 8,457,495 B2* | 6/2013 | Mizutani et al. | 398/70 |
| 8,488,965 B2* | 7/2013 | Mizutani et al. | 398/66 |
| 8,542,995 B2* | 9/2013 | Kim | 398/45 |
| 8,570,874 B2* | 10/2013 | Zheng | 370/236 |
| 2003/0048801 A1 | 3/2003 | Sala et al. | |
| 2003/0179780 A1 | 9/2003 | Walker et al. | |
| 2005/0129030 A1 | 6/2005 | Choi et al. | |
| 2007/0291777 A1 | 12/2007 | Jamieson et al. | |
| 2008/0080562 A1 | 4/2008 | Burch et al. | |
| 2009/0067850 A1 | 3/2009 | Mizutani et al. | |
| 2009/0274461 A1 | 11/2009 | Xu et al. | |
| 2010/0040369 A1 | 2/2010 | Zhao et al. | |
| 2010/0142944 A1 | 6/2010 | Zou | |
| 2011/0052206 A1 | 3/2011 | Zheng | |
| 2011/0129218 A1 | 6/2011 | Kim | |
| 2012/0020662 A1 | 1/2012 | Ding et al. | |
| 2012/0027405 A1 | 2/2012 | Zheng | |
| 2012/0301147 A1 | 11/2012 | Zhao et al. | |
| 2013/0089328 A1 | 4/2013 | Davis et al. | |

FOREIGN PATENT DOCUMENTS

| | | |
|---|---|---|
| CN | 1461131 A | 12/2003 |
| CN | 1507206 A | 6/2004 |
| CN | 1845546 A | 10/2006 |
| CN | 1921461 A | 2/2007 |
| CN | 101083657 A | 12/2007 |
| CN | 101577600 A1 | 11/2009 |
| EP | 1 953 937 A1 | 8/2008 |
| KR | 1020030073484 A | 9/2003 |

OTHER PUBLICATIONS

Written Opinion of the International Searching Authority dated Jul. 16, 2009 in connection with International Patent Application No. PCT/CN2009/071598.

Supplementary European Search Report dated May 26, 2011 in connection with European Patent Application No. EP 09 74 1699.

Juha Kannisto, et al., "Software and Hardware Prototypes of the IEEE 1588 Precision Time Protocol on Wireless LAN", Nov. 21, 2005, 6 pages.

"Series G: Transmission Systems and Media, Digital Systems and Networks, Digital sections and digital line system—Optical line systems for local and access networks, Gigabit-capable Passive Optical Networks (G-PON): Transmission convergence layer specification, Amendment 2", ITU-T, Mar. 2006, 11 pages.

Office Action dated Nov. 30, 2011 in connection with U.S. Appl. No. 13/269,483.

"Series G: Transmission Systems and Media, Digital Systems and Networks, Digital sections and digital line system—Optical line systems for local and access networks, Gigabit-capable Passive Optical Networks (G-PON): Transmission convergence layer specification", ITU-T, G.984.3, Feb. 2004, p. 24.

Translation of Office Action dated Mar. 31, 2012 in connection with Chinese Patent Application No. 200810096171.3.

"IEEE Standard for a Precision Clock Synchronization Protocol for Networked Measurement and Control Systems, IEEE Instrumentation and Measurement Society", IEEE Std 1588-2002, Nov. 8, 2002, 154 pages.

International Search Report issued Jul. 16, 2009 in connection with International Patent Application No. PCT/CN2009/071598.

Translation of Office Action dated Nov. 28, 2012 in connection with Chinaes Patent Application No. 200810096171.3.

* cited by examiner

*Primary Examiner* — Tri H Phan

(57) ABSTRACT

The present invention relates to method for synchronizing time, apparatus and system. The method discloses an OLT generates a Passive Optical Network (PON) downstream frame from to an Optical Network Unit (ONU), wherein the PON downstream frame comprises a time synchronization message based on Ethernet protocol, wherein the time synchronization message comprises a time value that is referenced to a PON Media Access Control (MAC) control layer and that indicates the ONU to adjust a time of a clock coupled to the ONU; and send the PON downstream frame.

20 Claims, 25 Drawing Sheets

METHOD, SYSTEM AND OPTICAL NETWORK DEVICE FOR SYNCHRONIZING TIME OF A PASSIVE OPTICAL NETWORK

CROSS-REFERENCE TO RELATED APPLICATIONS

This application is a continuation of U.S. patent application Ser. No. 12/942,196, filed on Nov. 9, 2010 which is a continuation of International Application No. PCT/CN2009/071598, filed on Apr. 30, 2009. The International Application claims priority to Chinese Patent Application No. 200810096171.3, filed on May 9, 2008. The aforementioned patent applications are hereby incorporated by reference in their entireties.

TECHNICAL FIELD

The present invention relates to the field of optical communications, and in particular, to an optical network device, a point-to-multipoint optical communications system, and a method for synchronizing time of a passive optical network.

BACKGROUND

A Passive Optical Network (PON) includes an Optical Distribution Network (ODN), which contains no electronic device or electronic power source and is entirely composed of passive devices such as optical splitters. A PON includes an Optical Line Terminal (OLT) installed in a central office and a batch of Optical Network Units (ONUs) installed at the customer premise. Three PON technologies are provided, Asynchronous Transfer Mode Passive Optical Network (APON), Ethernet Passive Optical Network (EPON) and Gigabit Passive Optical Network (GPON). EPON and GPON also evolve to the next generation PON (xPON).

Taking GPON as an example, the GPON protocol stack is illustrated in FIG. 1. The GPON protocol stack includes three layers, and they are briefly introduced in a down to top sequence.

One is the GPON Physical Medium Dependent (GPM) layer, which is responsible for the transmission of GPON Transmission Convergence (GTC) layer frames on optical fibers. It transmits optical signals from the optical fibers to the PON Media Access Control (MAC) layer for data processing and converts data signals received from the PON MAC layer into optical signals.

A second layer is the MAC layer. For GPON, the MAC layer is a GTC layer, which includes two sub-layers:

(a) TC Adapter Sublayer

The TC adapter sub-layer is responsible for fragmenting service data received from an Asynchronous Transfer Mode (ATM) client into ATM cells and fragmenting service data received from a GPON Encapsulation Method (GEM) client into GEM data blocks; the TC adapter sub-layer is also responsible for assembling ATM cells or GEM data blocks in a GTC frame to appropriate service data.

(b). GTC Framing Sub-Layer

The GTC framing sub-layer is responsible for assembling GTC TC frames. Specifically, the GTC framing sub-layer adds a GTC TC frame header before an ATM cell or a GEM data block according to control information of Physical Layer Operation, Administration and Maintenance (PLOAM) to create a complete GTC TC frame and send the frame to the GPM layer; the GTC framing sub-layer is also responsible for removing frame header information from a GTC TC frame received from the GPM layer and sending the frame with the frame header information removed to the TC adapter sub-layer for processing.

The GPON also has a third layer, which includes the ATM client, GEM client and the following units:

(1) PLOAM: responsible for functions like operation, administration and maintenance at the PON physical layer; and (2) ONU Management and Control Interface (OMCI): the OLT controls an Optical Network Terminal (ONT) via the OMCI; like common service data, OMCI data can be encapsulated to ATM cells or GEM data blocks for transmission.

IEEE 1588 is the Precision Time Protocol (PTP) of a system for network measurement and control, and implements synchronization of the slave clock of an ONT (client device) with the master clock of the main control device by sending/receiving clock packets. The principle of the IEEE 1588 PTP protocol is described as follows: Based on the most precise time when the synchronization packets are sent and received, each slave clock exchanges synchronization packets with the master clock to achieve synchronization with the master clock.

The synchronization process includes two stages: offset measurement stage and delay measurement stage.

FIG. 2A illustrates the offset measurement stage where the master clock broadcasts two messages to all nodes on the network:

1. sync message: denoting desired time for sending the message 2. follow-up message: denoting actual time for sending the message The sync messages are sent automatically at given intervals. The follow-up messages are employed to calculate the transmission delay caused by the local protocol when packets are sent. The master clock sends determined sync messages at regular intervals (generally once two seconds). The sync message contains a time stamp, which describes precisely the desired time the packet is sent. Assume that the time of the master clock before synchronization is $Tm=128$ s and that the slave clock time is $Ts=111$ s. The master clock measures that the precise sending time is $Tm1$ and the slave clock measures that the precise receiving time is $Ts1$. Because the sync message contains the desired sending time instead of the actual sending time, the master clock sends a follow-up message which contains a time stamp that records precisely the actual sending time $Tm1$ of the sync message. Thus, the slave clock can calculate the offset between the slave clock and the master clock according to the actual sending time in the follow-up message and the actual receiving time of the receiver:

$$\text{Offset} = Ts1 - Tm1 - \text{Delay} = 111.75 - 128.5 - 0 = 16.75 \text{ s}$$

The "delay" above means the transmission delay between the master clock and the slave clock and will be measured in the following measurement stage. At the current stage, the delay is unknown and assumed to be 0.

At the offset measurement stage, Adjust Time can be obtained and the slave clock is adjusted to:

$$\text{Adjust Time} = Ts - \text{Offset}$$

The second stage is the delay measurement stage as shown in FIG. 2B.

The delay measurement stage measures the delay caused by network transmission. The measurement is achieved through exchange of the following messages between the master clock and the slave clock:

1. The slave clock sends a Delay Request message, informing the master clock, "I send the Delay Request message at this moment."

2. The master clock sends a Delay Response message, informing the slave clock, "I receive your Delay Request message at this moment."

The slave clock sends the Delay Request at Ts3 130.75 s after receiving the sync message. The master clock sends the Delay Response to the slave clock after receiving the Delay Request and marks the precise receiving time Tm3 131.25 s in the Delay Response. Thus, the slave clock can calculate the accurate network delay.

$$Delay=(Tm3-Ts3)/2=(131.25-130.75)/2=0.25$$

IEEE 802.3 defines the basic structure of an Ethernet frame, including: preamble, Start Frame Delimiter (SFD), destination address, source address, length field, data field, and frame check sequence.

As shown in FIG. 3, the preamble consists of 8 bits of alternated 1s and 0s. The SFD includes 8 bits where the first 6 bits are alternated 1s and 0s and the last 2 bits are "1, 1" indicating the start of the frame to the receiver. Following the two bits are the actual fields of the frame.

In an Ethernet, all clock packets defined by IEEE 1588/1588v2 are transmitted in the form of IP multicast packets. The packet time stamp generating point for determining the time a clock packet is transmitted or received is located at the last bit of the SFD.

During the implementation of the present invention, the inventor finds at least the following weaknesses in the prior art:

When Ethernet data is encapsulated to GEM (that is, when the "Ethernet over GEM" mode is employed), each Ethernet frame is mapped into a GEM frame. As shown in FIG. 4, the GEM frame does not include the preamble and SFD, and the destination address, source address, length field, data field, and frame check sequence field of the Ethernet frame are directly mapped into the GEM payload for transmission. The GEM frame is automatically encapsulated with the GEM frame header which includes four parts: Payload Length Indicator (PLI, 12 bits), Port ID (12 bits), Payload Type Indicator (PTI, 3 bits), and Header Error Control (HEC, 13 bits).

In case of Ethernet over GEM mode, the Ethernet time stamp generating point required for sending IEEE 1588/1588v2 clock packets is lost. As a result, the time synchronization method defined by IEEE 1588/1588v2 is not supported in "Ethernet over GEM" mode.

SUMMARY

On the one hand, embodiments of the present invention provide an optical network device and a method for synchronizing time of a PON master clock, and this achieves time synchronization in the network.

For the above purpose, the following technical solution is provided:

A method for synchronizing time of a PON master clock, where a match rule for matching packet time stamp generating points is predefined on the master clock side, includes:

sending a first clock packet carried in a first downstream frame;

acquiring time at a packet time stamp generating point according to frame data of the first downstream frame at the PON MAC layer, and regarding the acquired time as the time the first clock packet is sent; and sending a second clock packet carried in a second downstream frame, where the second clock packet carries the time the first clock packet is sent.

An optical network device includes:

a sending unit, configured to send a first clock packet carried in a first downstream frame and a second clock packet carried in a second downstream frame, where the second clock packet carries the time the first clock packet is sent;

a first monitoring unit, configured to determine a packet time stamp generating point according to frame data of the first downstream frame at the PON MAC layer; and a first acquiring unit, configured to acquire time at the packet time stamp generating point, and regard the acquired time as the time the first clock packet is sent.

On the other hand, embodiments of the present invention provide an optical network device and a method for synchronizing time of a PON slave clock, and this achieves time synchronization in the network.

For the above purpose, the following technical solution is provided:

A method for synchronizing time of a PON slave clock, where a match rule for matching packet time stamp generating points is predefined on the slave clock side, and the method includes:

receiving a first clock packet carried in a first downstream frame;

acquiring time at a packet time stamp generating point according to frame data of the first downstream frame at the PON MAC layer, and regarding the acquired time as the time the first clock packet is received;

receiving a second clock packet carried in a second downstream frame, where the second clock packet carries the time the first clock packet is sent; and adjusting the local time according to a difference between the time the first clock packet is sent and the time the first clock packet is received.

An optical network device includes:

a receiving unit, configured to receive a first clock packet carried in a first downstream frame and a second clock packet carried in a second downstream frame, where the second clock packet carries the time the first clock packet is sent;

a first monitoring unit, configured to determine a packet time stamp generating point according to frame data of the first downstream frame at the PON MAC layer;

a first acquiring unit, configured to acquire time at the packet time stamp generating point, and regard the acquired time as the time the optical network device receives the first clock packet; and an adjusting unit, configured to adjust the local time according to a difference between the time the first clock packet is sent and the time the first clock packet is received.

In addition, embodiments of the present invention provide a point-to-multipoint optical communications system, which is able to determine the time a clock message is sent and/or received on the master/slave clock side, and this achieves time synchronization in the network.

For the above purpose, the following technical solution is provided:

A point-to-multipoint optical communications system includes an OLT and at least one ONU.

The OLT includes:

an OLT clock synchronization processing module, configured to send a first clock packet carried in a first downstream frame and a second clock packet carried in a second downstream frame to the ONU, where the second clock packet carries the time the first clock packet is sent; and an OLT clock packet time stamp generating module, configured to acquire time according to frame data of the first clock packet at the PON MAC layer, and regard the acquired time as the time the first clock packet is sent.

The ONU includes:

an ONU clock packet time stamp generating module, configured to acquire time according to frame data of the first clock packet at the PON MAC layer, and regard the acquired time as the time the first clock packet is received; and an ONU clock synchronization processing module, configured to receive the first downstream frame and the second downstream frame, and adjust the time of the ONU according to a difference between the time the first clock packet is sent and the time the first clock packet is received.

With the optical network device, point-to-multipoint optical communications system, and method for synchronizing time of a PON according to the embodiments of the present invention, the time a clock packet is sent and/or received on the master/slave clock side is acquired based on the packet time stamp generating point of the lower layer transmission frame, and therefore, the present invention enables multiple modes of clock packet encapsulation based on the PON transmission frame, for example, the application of IEEE 1588 in "Ethernet over GEM" mode. Thus, time is synchronized in the network.

DETAILED DESCRIPTION

To better explain the technical solution of the present invention, the embodiments of the present invention are described hereinafter in detail with reference to the accompanying drawings. On the one hand, an embodiment of the present invention provides a method for synchronizing time at a master clock side.

Figure 1:
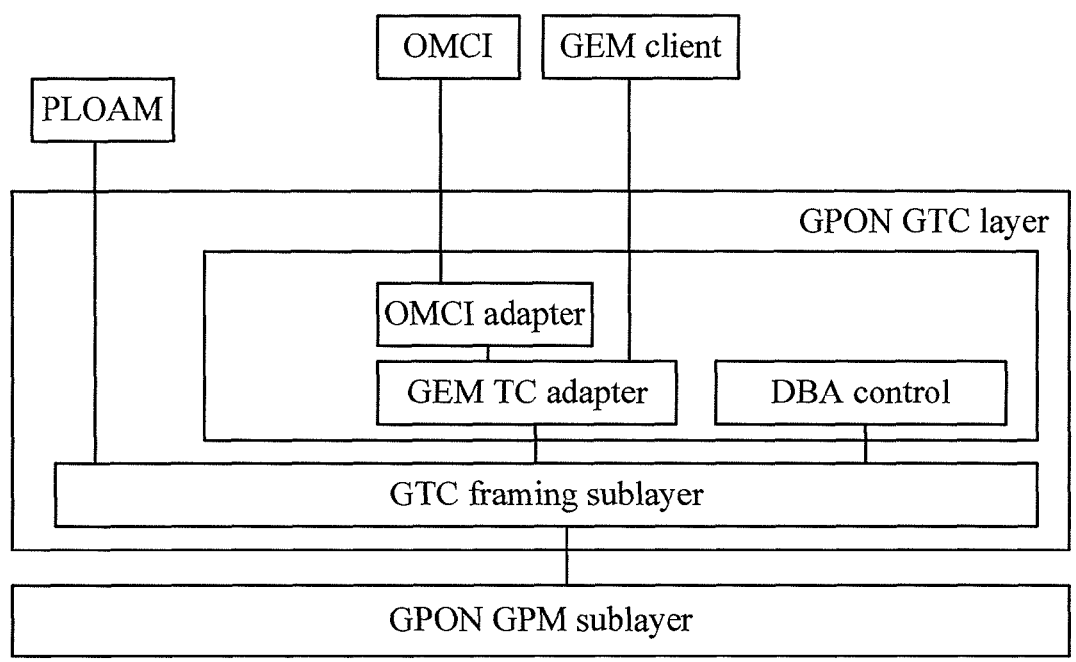
FIG. 1 is a schematic diagram illustrating a GPON protocol layered model in the prior art.
Figure 2A:
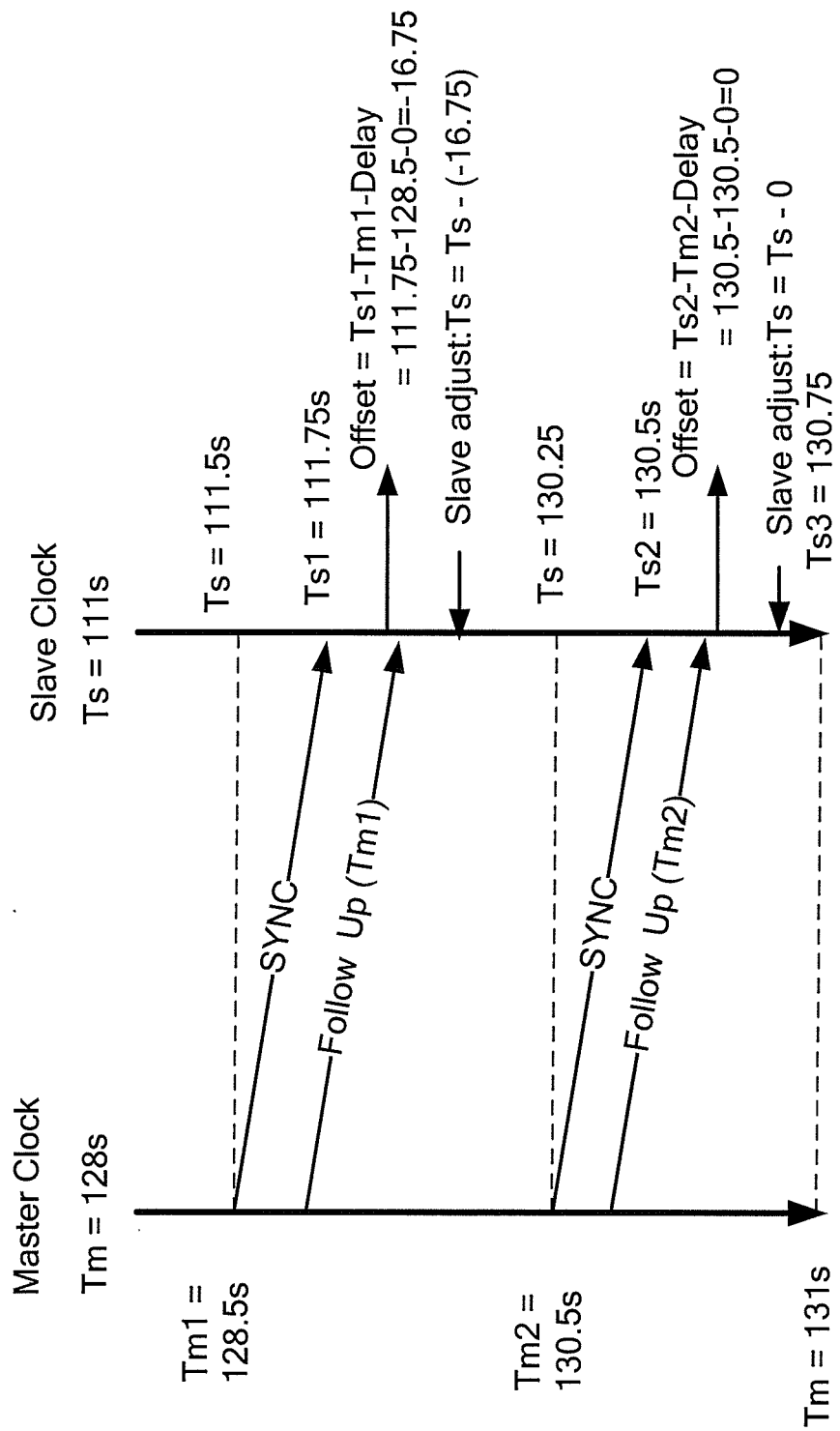
FIG. 2A is a schematic diagram illustrating the principle at the first-stage of the IEEE 1588 PTP protocol in the prior art.
Figure 2B:
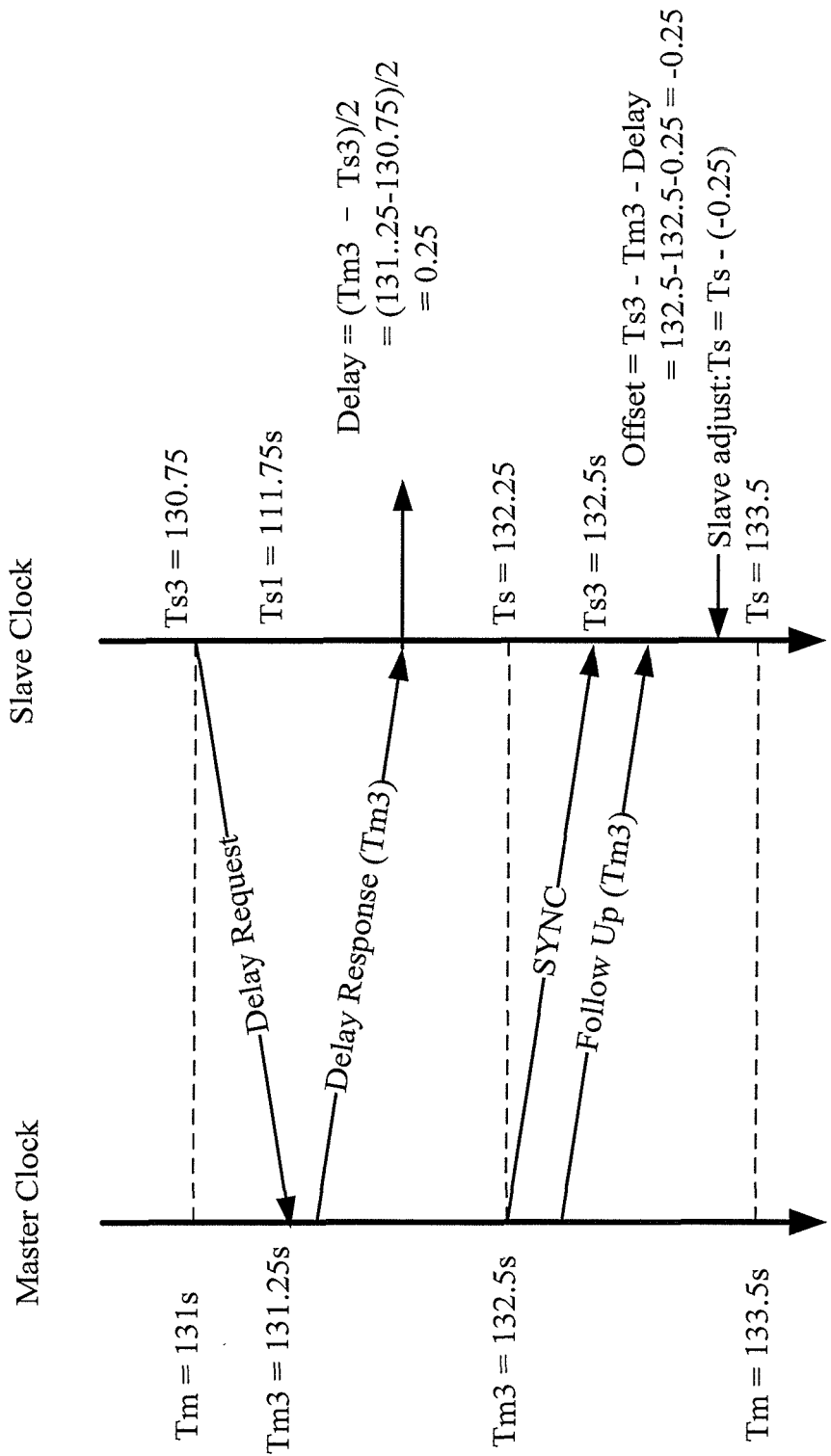
FIG. 2B is a schematic diagram illustrating the principle at the second-stage of the IEEE 1588 PTP protocol in the prior art.
Figure 3:
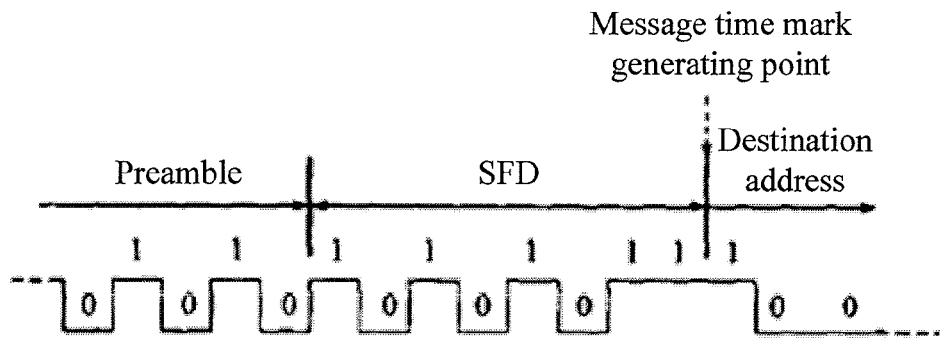
FIG. 3 is a schematic diagram illustrating a packet time stamp generating point in an Ethernet in the prior art.
Figure 4:
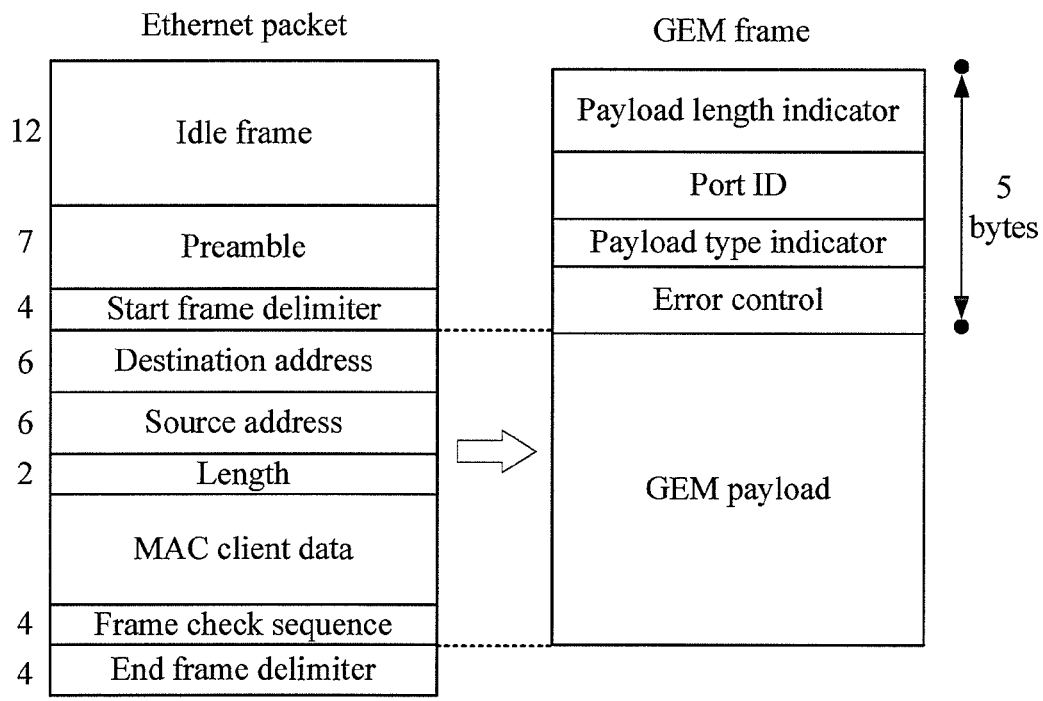
FIG. 4 is a schematic diagram illustrating "Ethernet over GEM" in the prior art.
Figure 5:
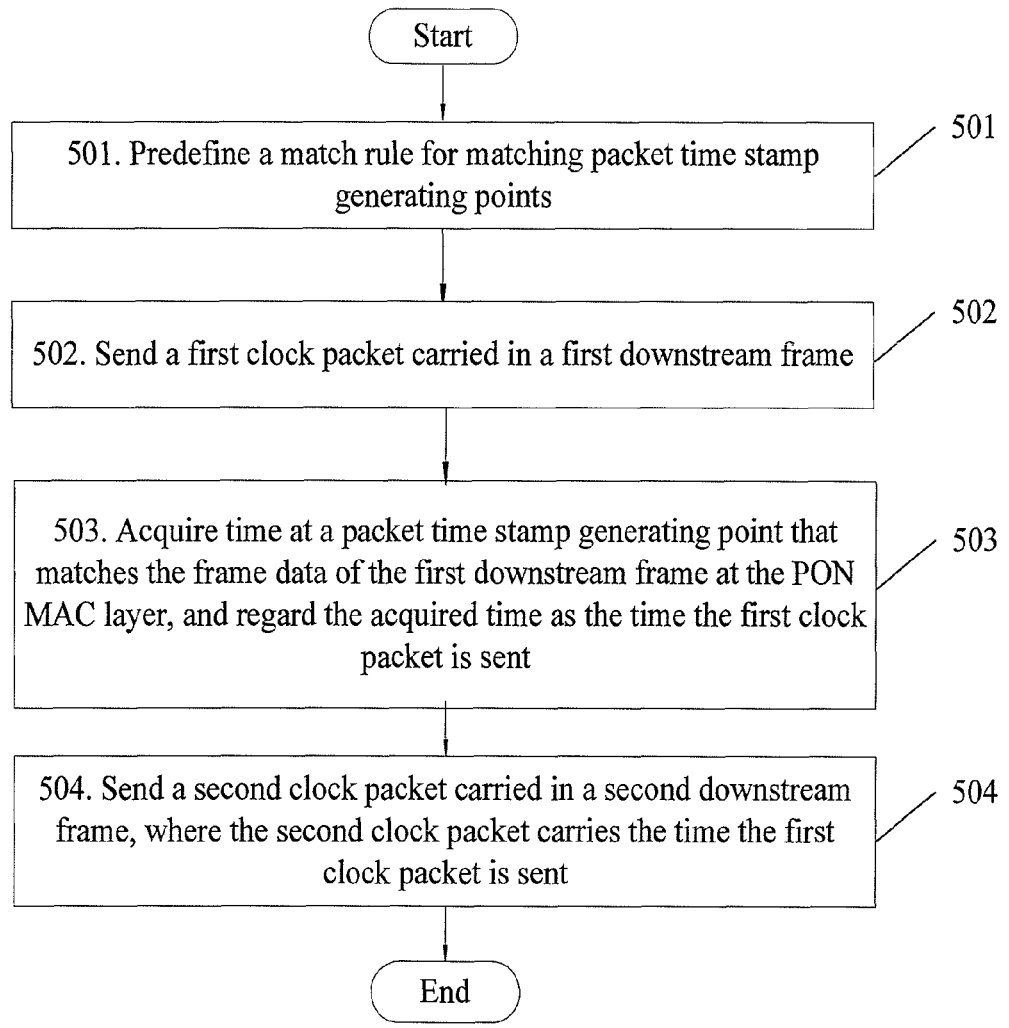
FIG. 5 is a flowchart of a method for synchronizing time of a master clock according to a first embodiment of the present invention.

As shown in FIG. 5, a method for synchronizing time at a master clock side according to an embodiment of the present invention includes the following steps:

501. A match rule is predefined for matching packet time stamp generating points.

502. An OLT sends a first clock packet carried in a first downstream frame.

The first clock packet may be a sync message or a Delay Response message.

503. The OLT measures or acquires time at the packet time stamp generating point that matches the frame data of the first downstream frame at the PON MAC layer, where the acquired time is regarded as the time the first clock packet is sent.

504. The OLT sends a second clock packet carried in a second downstream frame, where the second clock packet contains the time the first clock packet is sent.

The second clock packet is a follow-up message.

In the method for synchronizing time at a master clock side according to the embodiment of the present invention, the time a clock packet is sent is first acquired at the packet time stamp generating point, which is determined according to the lower layer transmission frame. Therefore, the method enables multiple modes of clock packet encapsulation based on the PON transmission frame, for example, the application of IEEE 1588 in case of Ethernet over GEM. Thus, time is synchronized in the network.

Figure 6:
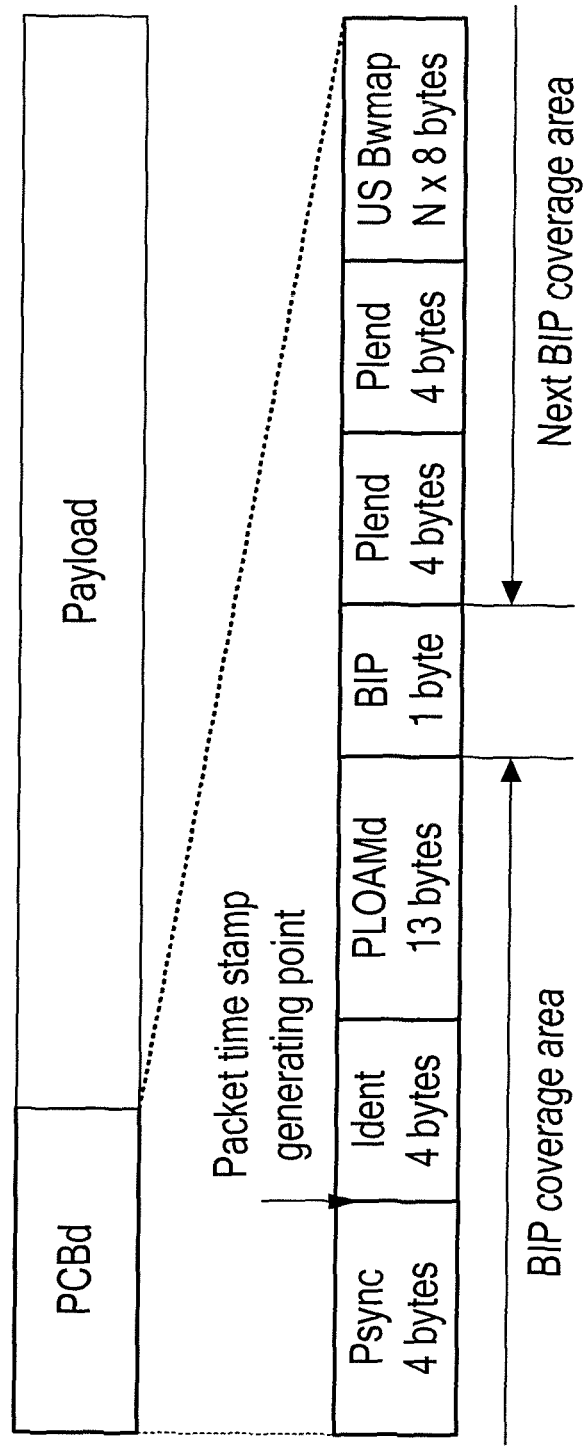
FIG. 6 is a schematic diagram illustrating a first time stamp generating point in a method for synchronizing time of a master clock of the present invention.

In the method, the step of acquiring the time at the packet time stamp generating point that matches the frame data of the first downstream frame at the PON MAC layer, regarding the acquired time as the time the first clock packet is sent includes: regarding the last bit of the physical synchronization (Psync) field in the frame header of the GTC TC frame of the first downstream frame at the GTC framing sub-layer as the packet time stamp generating point. As shown in FIG. 6, the downstream frame structure of the GTC TC frame includes a frame header and a payload. Physical Control Block downstream (PCBd) is the downstream frame header of the GTC TC frame. The packet time stamp generating point is located at the last bit of the Psync field in the GTC TC frame header.

Figure 7:
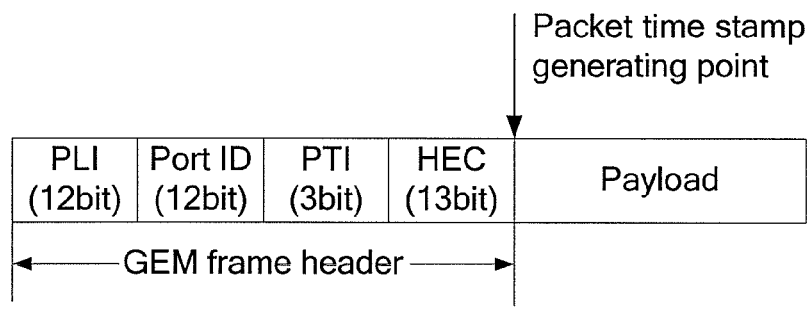
FIG. 7 is a schematic diagram illustrating a second time stamp generating point a method for synchronizing time of a master clock of the present invention.

Optionally, the step of acquiring the time at the packet time stamp generating point that matches the frame data of the first downstream frame at the PON MAC layer and regarding the acquired time as the time the first clock packet is sent includes: regarding the last bit of the HEC field in the frame header of the GEM frame of the first downstream frame at the TC adapter sub-layer as the packet time stamp generating point. As shown in FIG. 7, the GEM frame includes a frame header and a payload. The packet time stamp generating point is determined according to the GEM frame header. For example, the packet time stamp generating point is located at the last bit of the HEC field in the GEM frame header.

Figure 8:
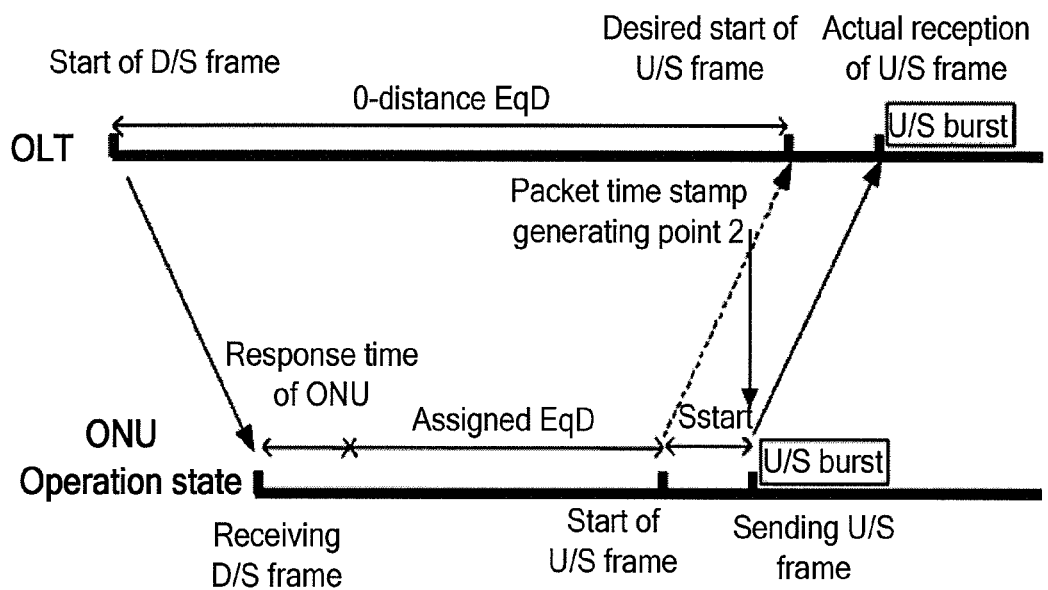
FIG. 8 is a schematic diagram illustrating a third time stamp generating point in a method for synchronizing time of a master clock of the present invention, where the ONU is in the Working state.
Figure 9:
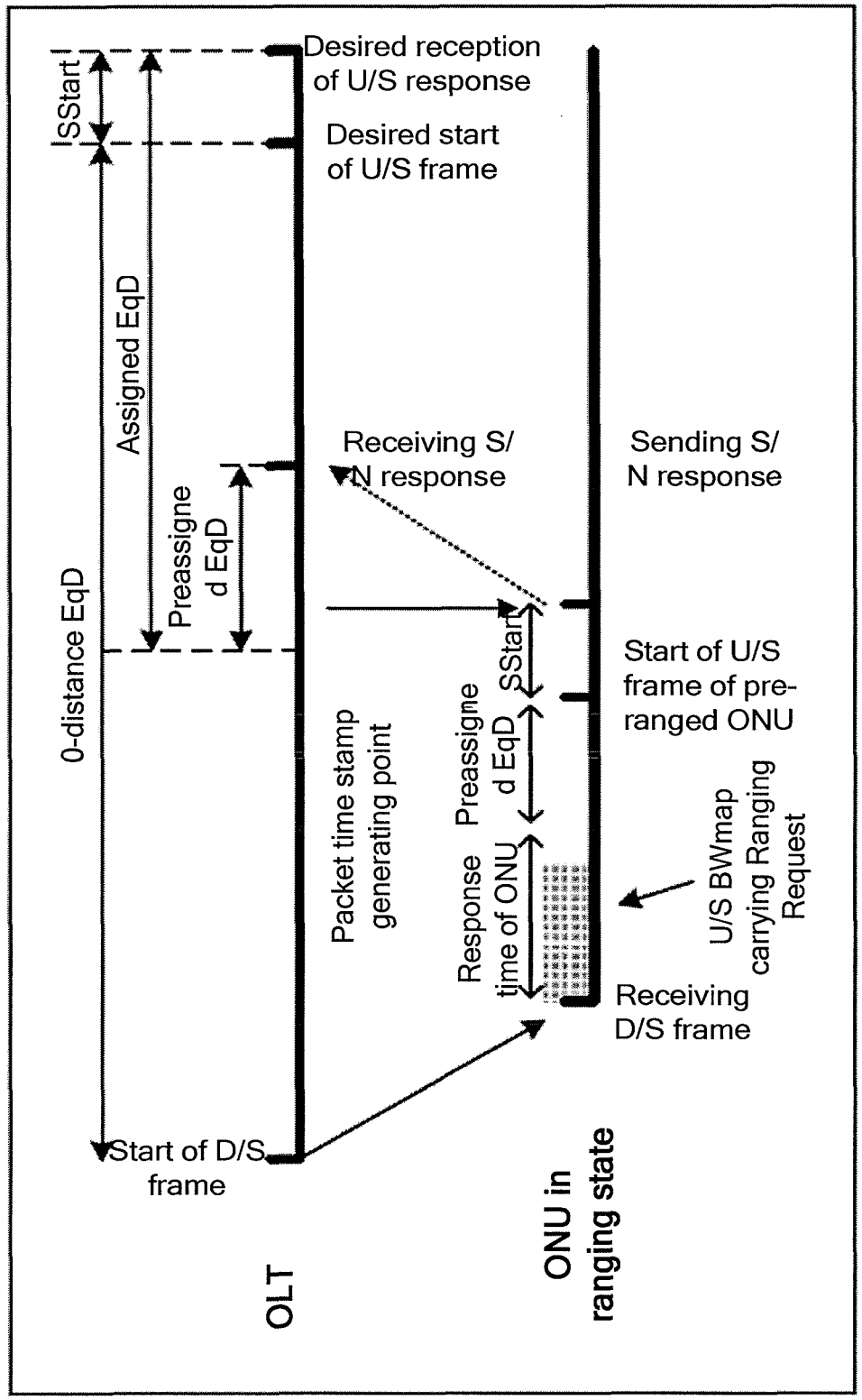
FIG. 9 is a schematic diagram illustrating a fourth time stamp generating point in a method for synchronizing time of a master clock of the present invention, where the ONU is in the Ranging state.

Optionally, the step of acquiring the time at the packet time stamp generating point that matches the frame data of the first downstream frame at the PON MAC layer and regarding the acquired time as the time the first clock packet is sent includes: determining the packet time stamp generating point according to the sum of the start time received by the ONU, the response time of the ONU, and the Equal Delay (EqD) of the ONU. The above basis for determining the packet time stamp generating point may be included in the first downstream frame or needs be added to the first downstream frame. For example, the OLT sends a bandwidth map (BWmap) message to the ONU. The BWmap message is used to allocate for each ONU a transmission interval that indicates the ONU to transmit upstream data therein. The StartTime (Sstart) field in the BWmap message includes a time indicator. As shown in FIG. 8 and FIG. 9, the packet time stamp generating point is determined according to the sum of the start time indicated by the Sstart field in the BWmap message received by the ONU, the response time of the ONU, and the EqD. The response time of the ONU is a performance index of the ONU and is dependent on the hardware configuration of the ONU. The EqD is dependent on the network delay.

Figure 10:
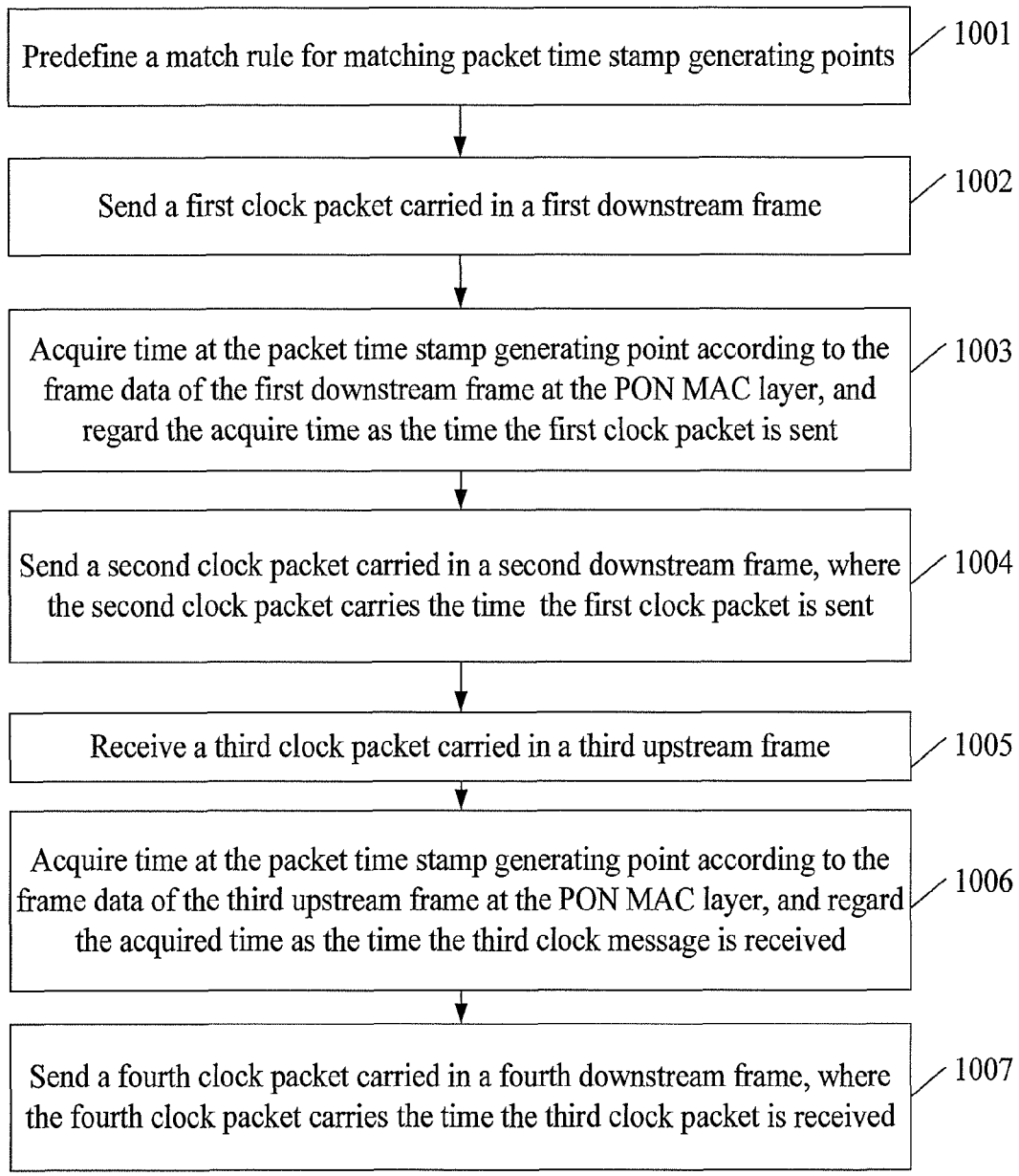
FIG. 10 is a flowchart of a method for synchronizing time of a master clock according to a second embodiment of the present invention.

As shown in FIG. 10, a method for synchronizing time at a master clock side provided in an embodiment of the present invention includes the following steps:

1001. A match rule is predefined for matching packet time stamp generating points.

1002. The OLT sends a first clock packet carried in a first downstream frame.

The first clock packet may be a sync message or a Delay Response message.

1003. The OLT acquires time at the packet time stamp generating point according to the frame data of the first downstream frame at the PON MAC layer, where the acquired time is regarded as the time the first clock packet is sent.

1004. The OLT sends a second clock packet which carries the time the first clock packet is sent. The second clock packet is a follow-up message and is carried in a second downstream frame.

1005. The OLT receives a third clock packet carried in a third upstream frame.

The third clock packet may be a Delay Request message.

1006. The OLT acquires time at the packet time stamp generating point according to the frame data of the third upstream frame at the PON MAC layer, and the acquired time is regarded as the time the OLT receives the third clock packet.

1007. The OLT sends a fourth clock packet, where the fourth clock packet carries the time the third clock packet is received and the fourth clock packet is carried in a fourth downstream frame.

The fourth clock packet is a Delay Response message.

Figure 11:
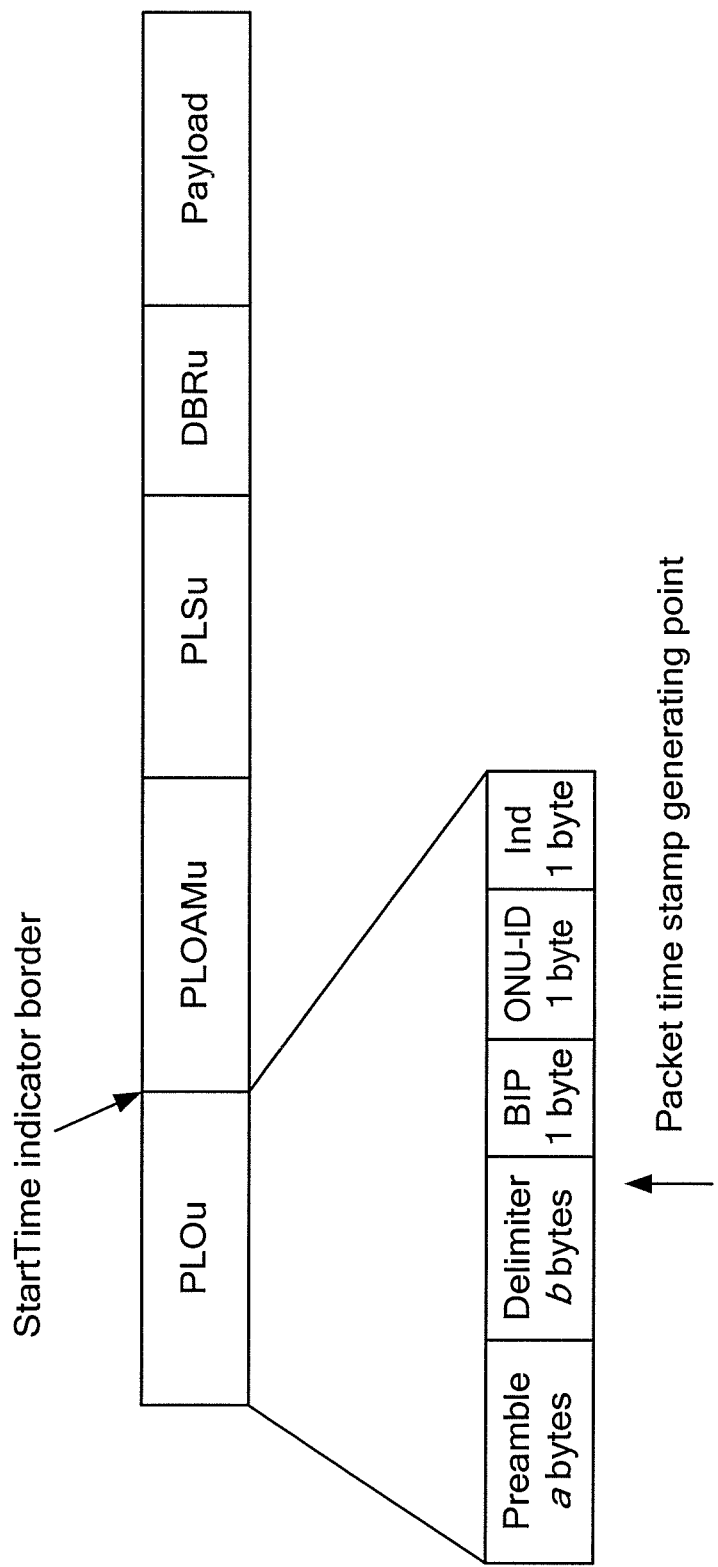
FIG. 11 is a schematic diagram illustrating a fifth time stamp generating point in a method for synchronizing time of a master clock of the present invention.

In the method, the step of acquiring the time at the packet time stamp generating point according to the frame data of the third upstream frame at the PON MAC layer and regarding the acquired time as the time the third clock packet is received includes: regarding the last bit of the Delimiter field in the frame header of the GTC TC frame of the third upstream frame at the GTC framing sub-layer as the packet time stamp generating point. As shown in FIG. 11, the GTC TC frame includes a frame header and a payload. In the upstream direction, that is, when the synchronization clock packet is sent from the ONU to the OLT, the packet time stamp generating point is located at the last bit of the Delimiter field in the GTC TC frame.

Optionally, the step of acquiring the time at the packet time stamp generating point according to the frame data of the third upstream frame at the PON MAC layer and regarding the acquired time as the time the third clock packet is received includes: regarding the last bit of the HEC field in the frame header of the GEM frame of the third upstream frame at the TC adapter sub-layer as the packet time stamp generating point, as shown in FIG. 7.

Optionally, the step of acquiring the time at the packet time stamp generating point according to the frame data of the third upstream frame at the PON MAC layer and regarding the acquired time as the time the third clock packet is received includes: regarding the last bit of the HEC field in the frame header of the GEM frame of the third upstream frame at the TC adapter sub-layer as the packet time stamp generating point. As shown in FIG. 11, the GTC TC frame includes a frame header and a payload. The Physical Layer Overhead upstream (PLOu) is the upstream frame header of the GTC TC frame. The payload is the upstream frame payload of the GTC TC frame. The last bit of the PLOu in the GTC TC frame header is regarded as the packet time stamp generating point.

The first, second, third, and fourth clock packets are carried over Ethernet protocols such as ETH, Internet Protocol (IP), and User Datagram Protocol (UDP). Or, the first, second, third, and fourth clock packets are carried in IEEE 1588/1588v2 over GEM mode; or the first, second, third, and fourth clock packets are carried in PLOAM messages; or the first, second, third, and fourth clock packets are carried in OMCI messages.

Figure 12:
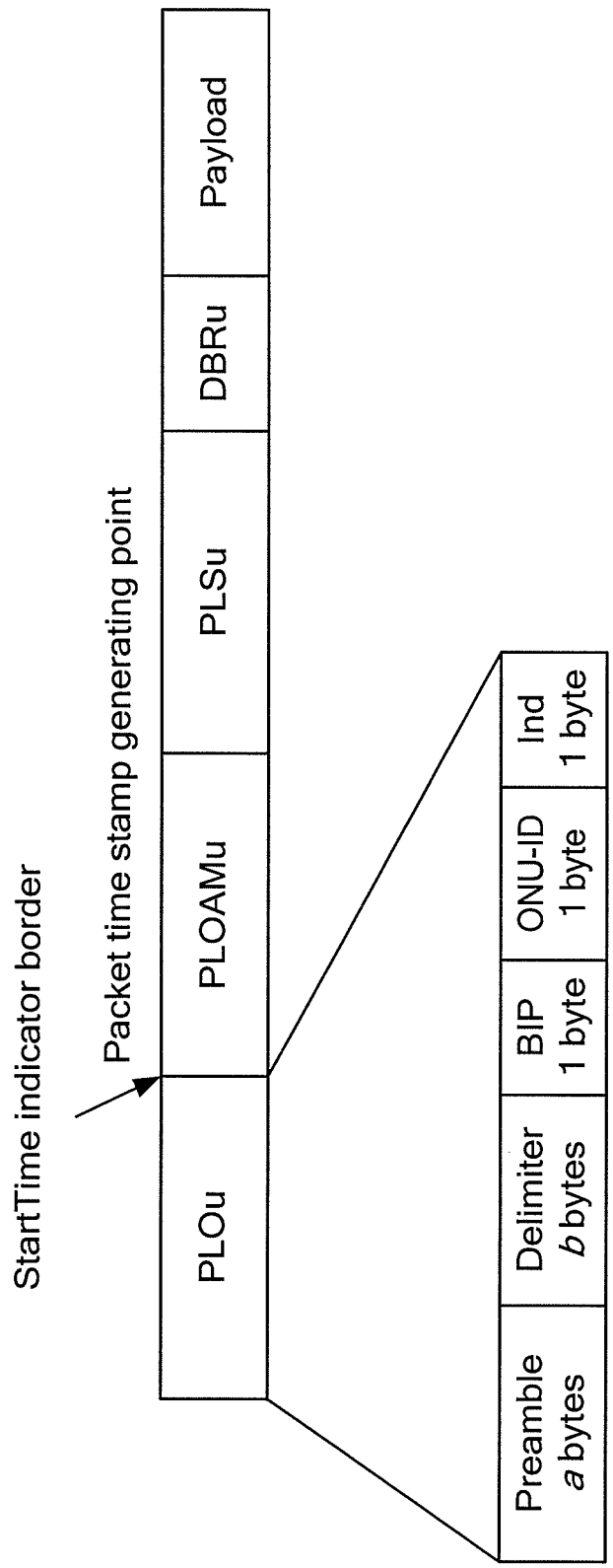
FIG. 12 is a schematic diagram illustrating a sixth time stamp generating point in a method for synchronizing time of a master clock of the present invention.
Figure 13:
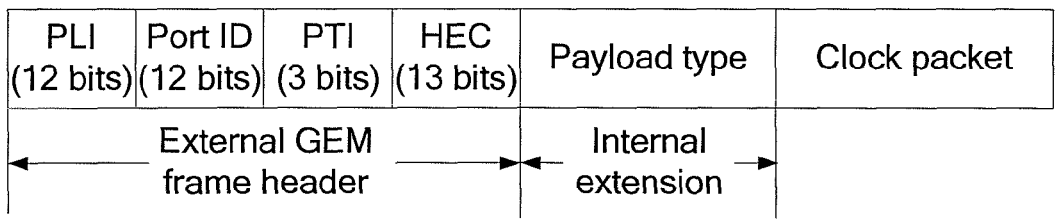
FIG. 13 is a schematic diagram illustrating a GEM frame structure in a method for synchronizing time of a master clock of the present invention.

In case of IEEE 1588/1588v2 over GEM mode, the PTI in the GEM frame header may indicate that the frame includes an internal extended field, and the PTI in the extended field indicates that the service type of the payload is IEEE 1588/1588v2 clock packet. For example, as shown in the following table, when the PTI code is 110, it indicates that an internal GEM frame extended field is carried. FIG. 12 illustrates the structure of a GEM frame when the PTI code is 110.

| PTI Code | Function |
| --- | --- |
| 000-101 | Same as in the prior art, indicates whether the GEM frame is the last section in case of sectional processing or whether congestion occurs. |
| 110 | Indicates that an internal GEM frame extended field is carried. |

Those skilled in the art can understand that the mode of transmitting and/or receiving clock packets here is also applicable to other embodiments of the present invention.

On the other hand, an embodiment of the present invention provides a method for synchronizing time of a slave clock.

Figure 14:
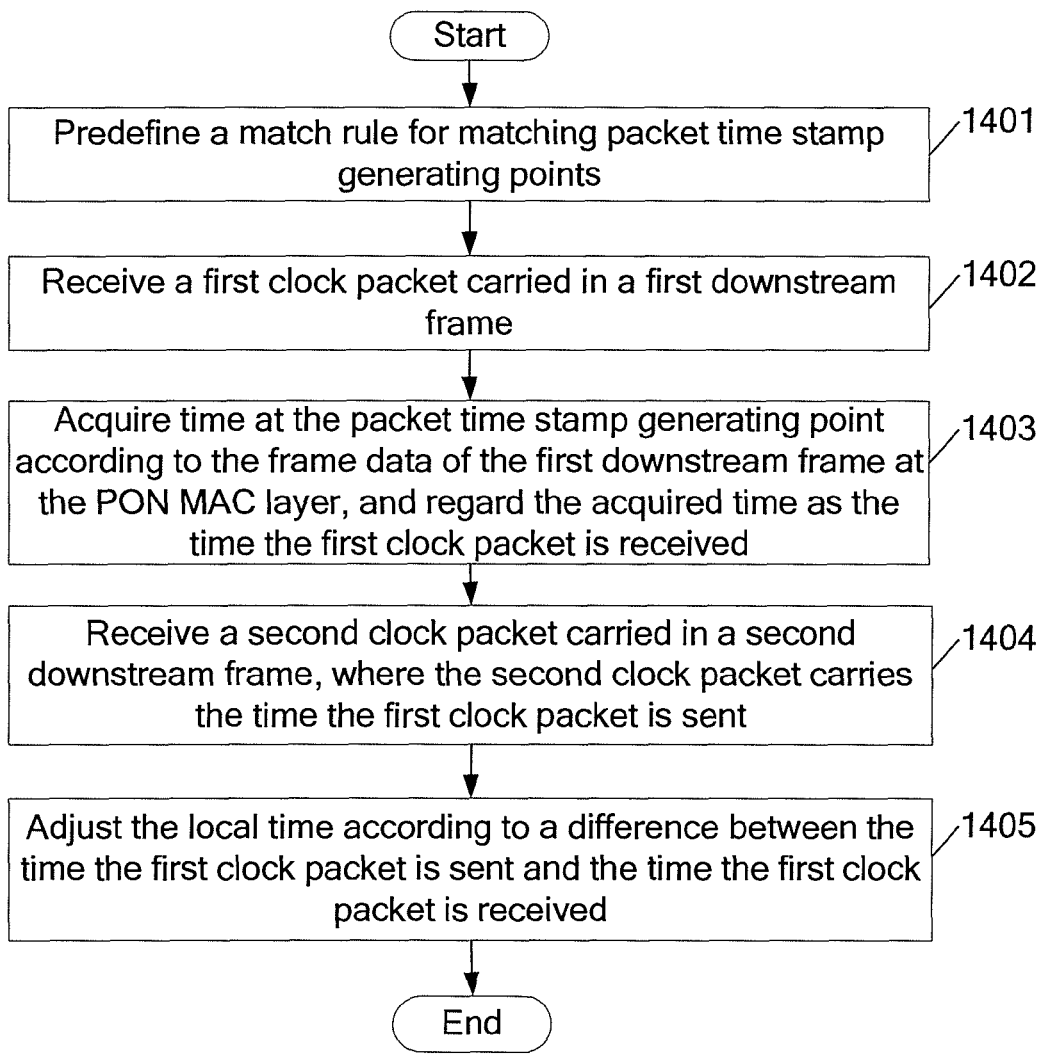
FIG. 14 is a flowchart of a method for synchronizing time of a slave clock according to a first embodiment of the present invention.

As shown in FIG. 14, the method for synchronizing time at a slave clock side includes:

1401. A match rule is predefined for matching packet time stamp generating points.

1402. The ONU receives a first clock packet from the OLT. The first clock packet is carried in a first downstream frame.

The first clock packet may be a sync message or a Delay Response message.

1403. The ONU acquires time at the packet time stamp generating point according to the frame data of the first downstream frame at the PON MAC layer and regards the acquired time as the time the ONU receives the first clock packet.

1404. The ONU receives a second clock packet, where the second clock packet carries the time the first clock packet is sent and the second clock packet is carried in a second downstream frame.

The second clock packet is a follow-up message.

1405. The ONU adjusts the local time according to a difference between the time the OLT sends the first clock packet and the time the ONU receives the first clock packet.

In the slave clock time synchronization method according to the embodiment of the present invention, a packet time stamp generating point is first determined based on the lower layer and then the time a clock packet is sent and/or received on the slave clock side is determined according to the packet time stamp generating point. Therefore, the method enables multiple modes of clock packet encapsulation based on the PON transmission frame, for example, the application of IEEE 1588 in case of Ethernet over GEM mode. Thus, time is synchronized in the network.

In the method, the step of acquiring the time at the packet time stamp generating point according to the frame data of the first downstream frame at the PON MAC layer and regarding the acquired time as the time the ONU receives the first clock packet includes: regarding the last bit of the Psync field in the frame header of the GTC TC frame of the first downstream frame at the GTC framing sub-layer as the packet time stamp generating point, as shown in FIG. 6.

Optionally, the step of acquiring the time at the packet time stamp generating point according to the frame data of the first downstream frame at the PON MAC layer and regarding the acquired time as the time the ONU receives the first clock packet includes: regarding the last bit of the HEC field in the frame header of the GEM frame of the first downstream frame at the TC adapter sub-layer as the packet time stamp generating point, as shown in FIG. 7.

Optionally, the step of acquiring the time at the packet time stamp generating point according to the frame data of the first downstream frame at the PON MAC layer and regarding the acquired time as the time the ONU receives the first clock packet includes: determining the packet time stamp generating point according to the sum of the start time received by the ONU, the response time of the ONU, and the EqD of the ONU, as shown in FIG. 8 and FIG. 9.

Figure 15:
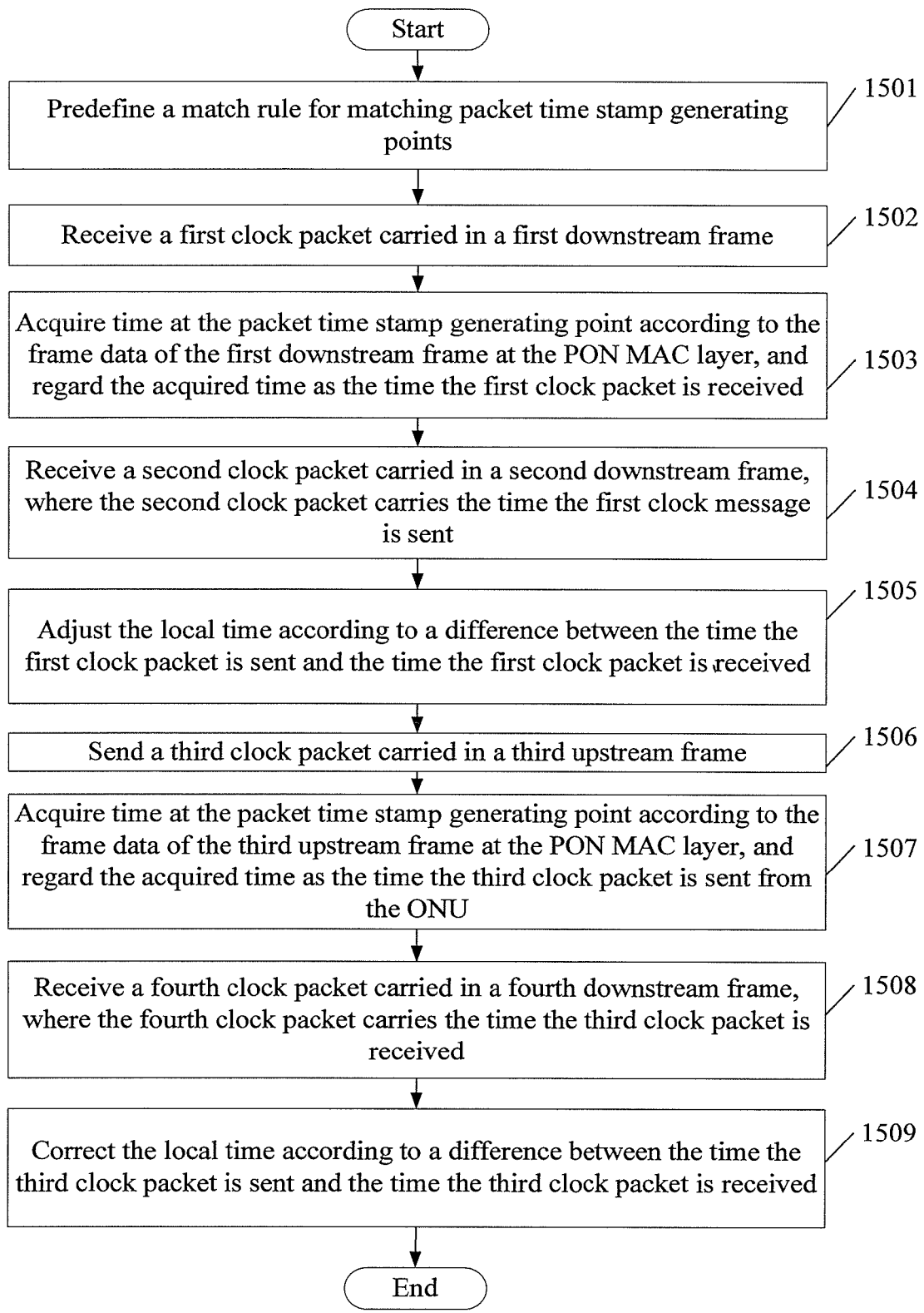
FIG. 15 is a flowchart of a method for synchronizing time of a slave clock according to a second embodiment of the present invention.

As shown in FIG. 15, a method for synchronizing time at a slave clock side in an embodiment of the present invention includes:

1501. A match rule is predefined for matching packet time stamp generating points.

1502. The ONU receives a first clock packet from the OLT. The first clock packet is carried in a first downstream frame.

1503. The ONU acquires time at the packet time stamp generating point according to the frame data of the first downstream frame at the PON MAC layer and regards the acquired time as the time the ONU receives the first clock packet.

1504. The ONU receives a second clock packet from the OLT. The second clock packet carries the time the OLT sends the first clock packet.

1505. The ONU adjusts the local time according to a difference between the time the OLT sends the first clock packet and the time the ONU receives the first clock packet.

1506. The ONU sends a third clock packet to the OLT.

1507. The ONU acquires time at the packet time stamp generating point according to the frame data of the third upstream frame at the PON MAC layer and regards the acquired time as the time the ONU sends the third clock packet.

1508. The ONU receives a fourth clock packet from the OLT. The fourth clock packet carries the time the OLT receives the third clock packet.

1509. The ONU corrects the local time according to a difference between the time the ONU sends the third clock packet and the time the OLT receives the third clock packet.

In the method, the step of acquiring the time at the packet time stamp generating point according to the frame data of the third upstream frame at the PON MAC layer and regarding the acquired time as the time the third clock packet is sent includes: regarding the last bit of the Delimiter field in the frame header of the GTC TC frame of the third upstream frame at the GTC framing sub-layer as the packet time stamp generating point, as shown in FIG. 11.

Optionally, the step of acquiring the time at the packet time stamp generating point according to the frame data of the third upstream frame at the PON MAC layer and regarding the acquired time as the time the third clock packet is sent includes: regarding the last bit of the HEC field in the frame header of the GEM frame of the third upstream frame at the TC adapter sub-layer as the packet time stamp generating point, as shown in FIG. 7.

Optionally, the step of acquiring the time at the packet time stamp generating point according to the frame data of the third upstream frame at the PON MAC layer and regarding the acquired time as the time the third clock packet is sent includes: regarding the last bit of the PLOu field in the frame header of the GTC TC frame of the third upstream frame at the GTC framing sub-layer as the packet time stamp generating point, as shown in FIG. 12.

In the embodiment of the present invention, the packet time stamp generating point is determined at the lower layer (GTC framing sub-layer or TC adapter sub-layer) of the PON and thus the precision and accuracy of the generated time stamp are improved.

The first, second, third, and fourth clock packets are carried over an Ethernet protocol; or in IEEE 1588/1588v2 over GEM mode; or in PLOAM messages; or in OMCI messages.

The first, second, third, and fourth clock packets are received when the ONU is in the Working state or Ranging state. The third clock packet is sent when the ONU is in the Working state or Ranging state. As shown in FIG. 8, the clock packets are sent and/or received when the ONU is in the Working state; or as shown in FIG. 9, the clock packets are sent and/or received when the ONU is in the Ranging state. The clock packets are not sent when the ONU is in the Serial Number state to avoid a great error in time synchronization caused by the random delay.

Those skilled in the art understand that all or part of the steps in the methods according to the above embodiments of the present invention can be completed by hardware under software instructions. The software according to the embodiments of the present invention can be stored in a computer-readable medium.

Another embodiment of the present invention provides an optical network device on the master clock side, namely, an OLT.

Figure 16:
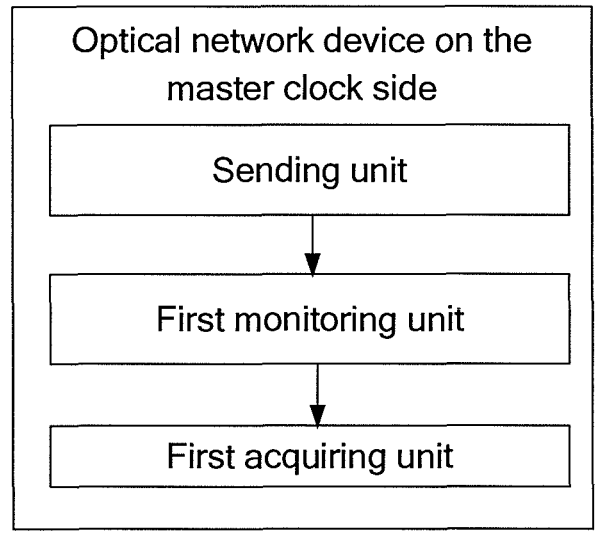
FIG. 16 illustrates a structure of an optical network device on the master clock side according to a first embodiment of the present invention.

As shown in FIG. 16, the optical network device on the master clock side includes:

a sending unit, configured to send a first clock packet carried in a first downstream frame and a second clock packet carried in a second downstream frame, where the second clock packet carries the time stamp when the OLT sends the first clock packet;

a first monitoring unit, configured to determine the packet time stamp generating point according to the frame data of the first downstream frame at the PON MAC layer; and a first acquiring unit, configured to acquire time at the packet time stamp generating point and regard the acquired time as the time the OLT sends the first clock packet.

The optical network device on the master clock side according to the embodiment of the present invention monitors the packet time stamp generating point based on the lower layer and acquires the time the clock packet is sent on the master clock side at the packet time stamp generating point. Therefore, the optical network device on the master clock side is able to support IEEE 1588/188v2 time synchronization in Ethernet over GEM mode and thus realizes time synchronization in the network.

The first monitoring unit is also configured to:

regard the last bit of the Psync field in the frame header of the GTC TC frame of the first downstream frame at the GTC framing sub-layer as being the packet time stamp generating point; or regard the last bit of the HEC field in the frame header of the GEM frame of the first downstream frame at the TC adapter sub-layer as being the packet time stamp generating point; or determine the packet time stamp generating point according to the sum of the start time received by the ONU, the response time of the ONU, and the EqD of the ONU.

Figure 17:
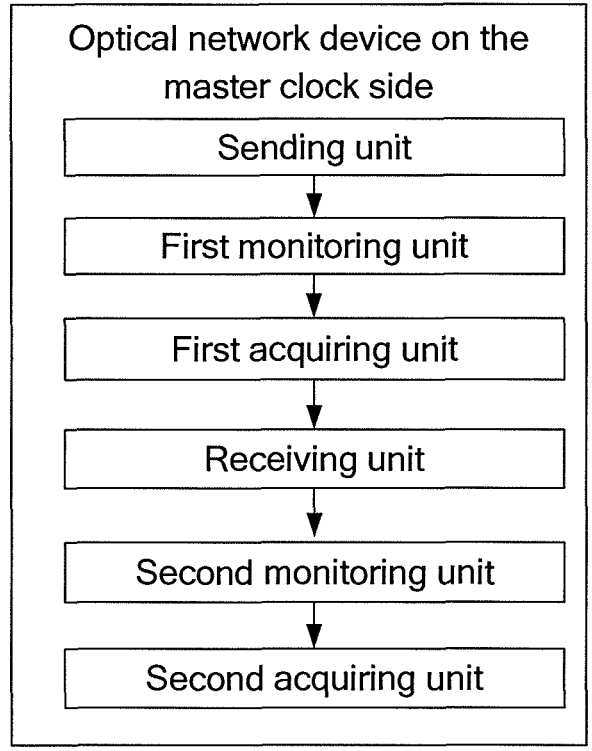
FIG. 17 illustrates a structure of an optical network device on the master clock side according to a second embodiment of the present invention.

As shown in FIG. 17, the optical network device on the master clock side according to the embodiment of the present invention further includes:

a receiving unit, configured to receive a third clock packet carried in a third upstream frame;

a second monitoring unit, configured to determine the packet time stamp generating point according to the frame data of the third upstream frame at the PON MAC layer; and a second acquiring unit, configured to acquire time at the packet time stamp generating point and regard the acquired time as the time the OLT receives the third clock packet.

The sending unit is further configured to send a fourth clock packet of the OLT, where the fourth clock packet carries the time stamp when the OLT receives the third clock packet.

The second monitoring unit is also configured to:

regard the last bit of the Delimiter field in the frame header of the GTC TC frame of the third upstream frame at the GTC framing sub-layer as the packet time stamp generating point; or regard the last bit of the HEC field in the frame header of the GEM frame of the third upstream frame at the TC adapter sub-layer as the packet time stamp generating point; or regard the last bit of the PLOu field in the frame header of the GTC TC frame of the third upstream frame at the GTC framing sub-layer as the packet time stamp generating point.

In the embodiment of the present invention, the optical network device on the master clock side determines the time stamp generating point based on the lower layer (GTC framing sub-layer or TC adapter layer) of the PON, and thus the precision and accuracy of the generated time stamp are improved.

On the other hand, an embodiment of the present invention provides an optical network device on the slave clock side, namely, an ONU.

Figure 18:
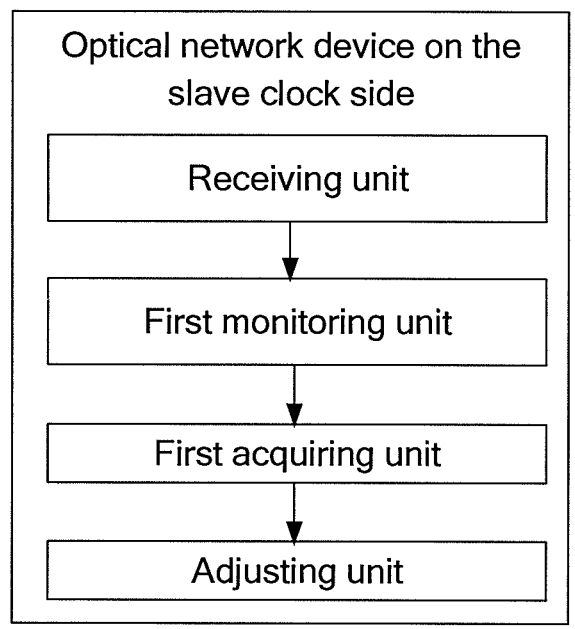
FIG. 18 illustrates a structure of an optical network device on the slave clock side according to a first embodiment of the present invention.

As shown in FIG. 18, the optical network device on the slave clock side includes:

a receiving unit, configured to receive a first clock packet and a second clock packet from the OLT, where the second clock packet carries the time stamp when the OLT sends the first clock packet;

a first monitoring unit, configured to determine the packet time stamp generating point according to the frame data of the first downstream frame at the PON MAC layer;

a first acquiring unit, configured to acquire time at the packet time stamp generating point, where the acquired time is regarded as the time the ONU receives the first clock packet; and an adjusting unit, configured to adjust the local time of the ONU according to a difference between the time the OLT sends the first clock packet and the time the ONU receives the first clock packet.

The first monitoring unit is also configured to:

regard the last bit of the Psync field in the frame header of the GTC TC frame of the first downstream frame at the GTC framing sub-layer as the packet time stamp generating point; or regard the last bit of the HEC field in the frame header of the GEM frame of the first downstream frame at the TC adapter sub-layer as the packet time stamp generating point; or determine the packet time stamp generating point according to the sum of the start time received by the ONU which is contained in the first downstream frame or needs to be added in the first downstream frame, the response time of the ONU, and the EqD of the ONU.

Figure 19:
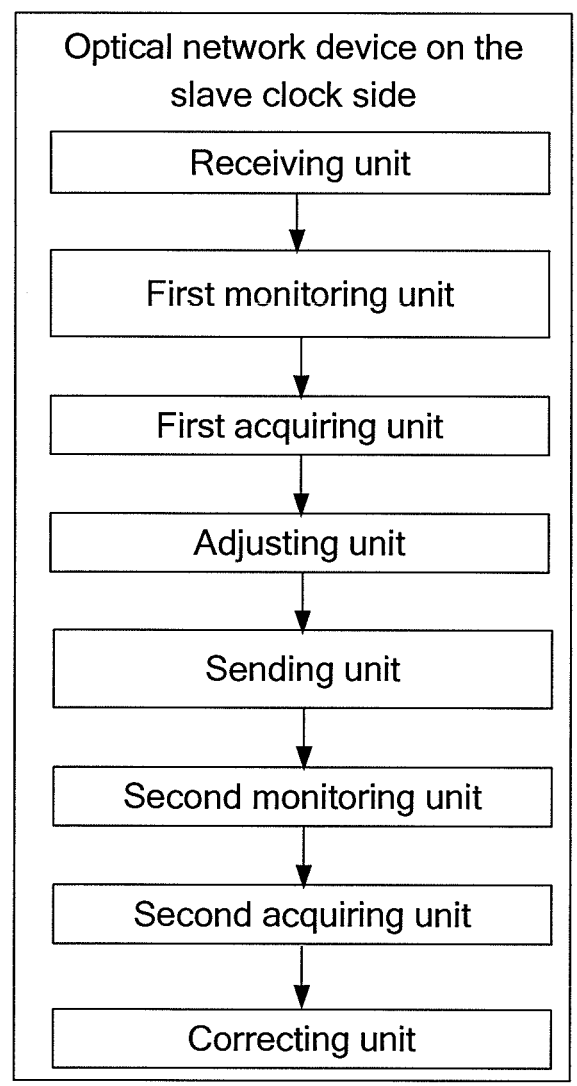
FIG. 19 illustrates a structure of an optical network device on the slave clock side according to a second embodiment of the present invention.

As shown in FIG. 19, the optical network device on the slave clock side further includes:

a sending unit, configured to send a third clock packet carried in a third upstream frame;

a second monitoring unit, configured to determine the packet time stamp generating point according to the frame data of the third upstream frame at the PON MAC layer;

a second acquiring unit, configured to acquire time at the packet time stamp generating point and regard the acquired time as the time the ONU sends the third clock packet; and a correcting unit, configured to correct the local time of the ONU according to a difference between the time the ONU sends the third clock packet and the time the OLT receives the third clock packet.

The receiving unit is further configured to receive from the OLT a fourth clock packet carried in a fourth downstream frame, where the fourth clock packet carries the time stamp when the OLT receives the third clock packet.

The second monitoring unit is further configured to:

regard the last bit of the Delimiter field in the frame header of the GTC TC frame of the third upstream frame at the GTC framing sub-layer as the packet time stamp generating point; or regard the last bit of the HEC field in the frame header of the GEM frame of the third upstream frame at the TC adapter sub-layer as the packet time stamp generating point; or regard the last bit of the PLOu field in the frame header of the GTC TC frame of the third upstream frame at the GTC framing sub-layer as the packet time stamp generating point.

The optical network device on the slave clock side according to the embodiment of the present invention monitors the packet time stamp generating point based on the lower layer and acquires the time a clock packet is received on the slave clock side at the packet time stamp generating point. Therefore, the optical network device on the slave clock side supports multiple modes of clock packet encapsulation over the PON transmission frame, for example, the application of IEEE 1588 in case of Ethernet over GEM. Thus, time is synchronized in the network. In addition, the packet time stamp generating point is determined at the lower layer (GTC framing sub-layer or TC adapter sub-layer) of the PON and thus the precision and accuracy of the generated time stamp are improved.

An embodiment of the present invention provides a point-to-multipoint optical communications system.

Figure 20:
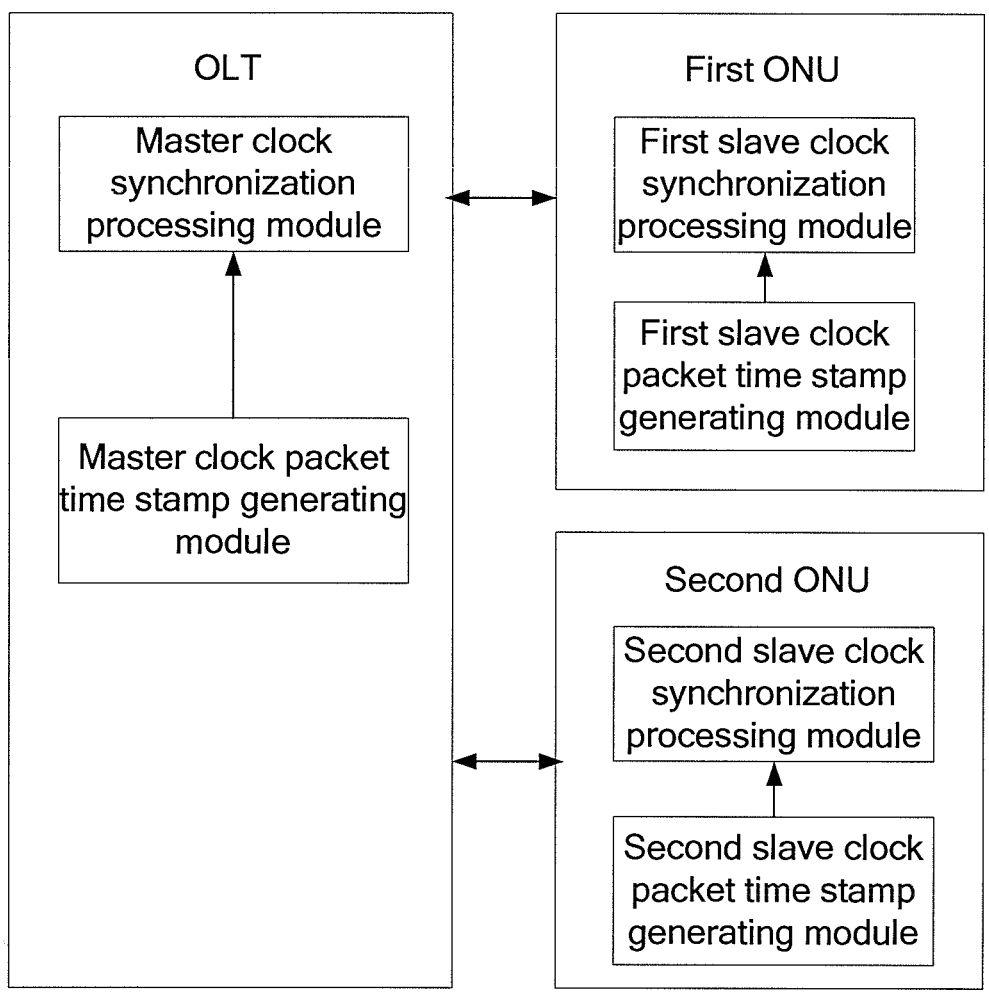
FIG. 20 is a structure of an optical communications system according to an embodiment of the present invention.

As shown in FIG. 20, the point-to-multipoint optical communications system according to the embodiment of the present invention includes an OLT and at least one ONU coupled to the OLT.

The OLT includes:

a master clock synchronization processing module, configured to send a first clock packet carried in a first downstream frame and a second clock packet carried in a second downstream frame to the ONU, where the second clock packet carries the time stamp when the OLT sends the first clock packet; and a master clock packet time stamp generating module, configured to acquire the time the OLT sends the first clock packet according to the frame data of the first clock packet at the PON MAC layer.

The ONU includes:

a slave clock synchronization processing module, configured to receive the first clock packet and the second clock packet, where the second clock packet carries the time stamp when the OLT sends the first clock packet, and adjust the time of the ONU according to the difference between the time the OLT sends the first clock packet and the time the ONU receives the first clock packet; and a slave clock packet time stamp generating module, configured to acquire the time the ONU receives the first clock packet according to the frame data of the first clock packet at the PON MAC layer.

Optionally, the master clock synchronization processing module is further configured to receive a third clock packet and send a fourth clock packet, where the fourth clock packet carries the time stamp when the OLT receives the third clock packet.

The master clock packet time stamp generating module is further configured to acquire the time the OLT receives the third clock packet according to the frame data of the third clock packet at the PON MAC layer.

The slave clock synchronization processing module is further configured to send the third clock packet; receive from the OLT the fourth clock packet which carries the time stamp when the OLT receives the third clock packet; and correct the time of the ONU according to the difference between the time the ONU sends the third clock packet and the time the OLT receives the third clock packet.

The slave clock packet time stamp generating module is further configured to acquire the time the ONU sends the third clock packet according to the frame data of the third clock packet at the PON MAC layer.

The optical communications system according to the embodiment of the present invention monitors the packet time stamp generating point based on the lower layer and then determines the time a clock packet is sent and received on the master clock side according to the packet time stamp generating point. Therefore, the optical communications system supports multiple modes of clock packet encapsulation based on the PON transmission frame, for example, the application of IEEE 1588 in case of Ethernet over GEM. Thus, time is synchronized in the network. In addition, the packet time stamp generating point is determined at the lower layer (GTC framing sub-layer or TC adapter sub-layer) of the PON and thus the precision and accuracy of the generated time stamp are improved.

The application of the optical communications system in the embodiment of the present invention is described hereinafter.

Figure 21:
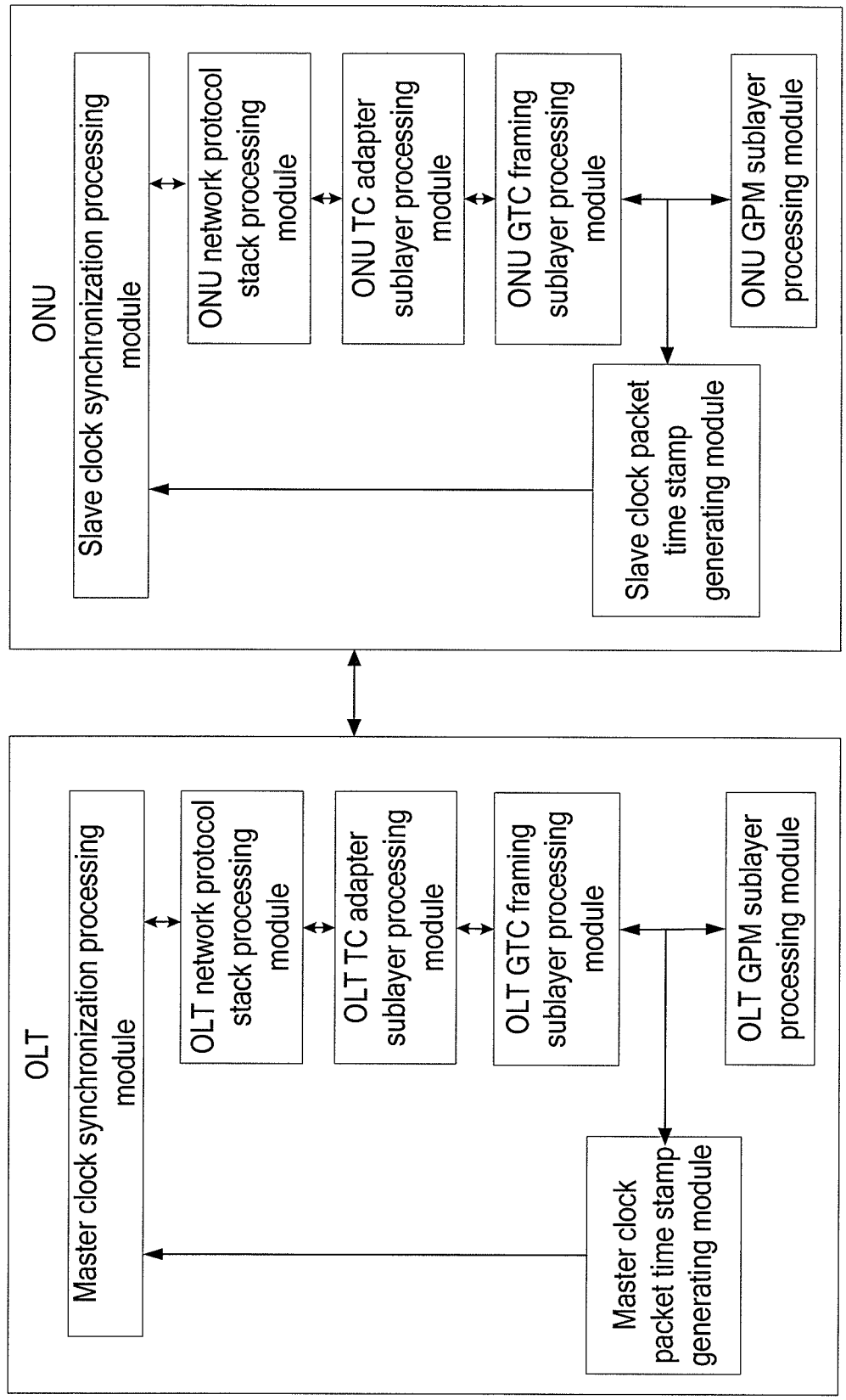
FIG. 21 illustrates a first application of an optical communications system according to an embodiment of the present invention.

FIG. 21 illustrates a first application of the optical communications system according to the embodiment of the present invention, where the first, second, third, and fourth clock packets are carried over an Ethernet protocol. On the master clock side, the OLT includes a master clock packet time stamp generating module, a master clock synchronization processing module, an OLT GPM sub-layer processing module, an OLT GTC framing sub-layer processing module, an OLT TC adapter sub-layer processing module, and an OLT network protocol stack processing module. The master clock packet time stamp generating module is configured to determine the position of the master clock packet time stamp generating point and generate time stamp information according to the GTC TC frame header at the GTC framing sub-layer. The master clock synchronization processing module is configured to complete IEEE 1588 protocol processing and exchange clock packets with the OLT to determine the time a clock packet is sent or received according to the time stamp. The network protocol stack processing module is configured to process the protocol stack carrying the clock packets. The protocol stack may be ETH, IP or UDP. On the slave clock side, the ONU includes a slave clock packet time stamp generating module, a slave clock synchronization processing module, an ONU GPM sub-layer processing module, an ONU GTC framing sub-layer processing module, an ONU TC adapter sub-layer processing module, and an ONU network protocol stack processing module. The slave clock packet time stamp generating module is configured to determine the position of the slave clock packet time stamp generating point and generate time stamp information according to the GTC TC frame header at the GTC framing sub-layer. The slave clock synchronization processing module is configured to complete IEEE 1588 protocol processing and exchange clock packets with the OLT to determine the time a clock packet is sent and received according to the time stamp. The ONU network protocol stack processing module is configured to process the protocol stack carrying the clock packets. The protocol stack may be ETH, IP or UDP.

Figure 22:
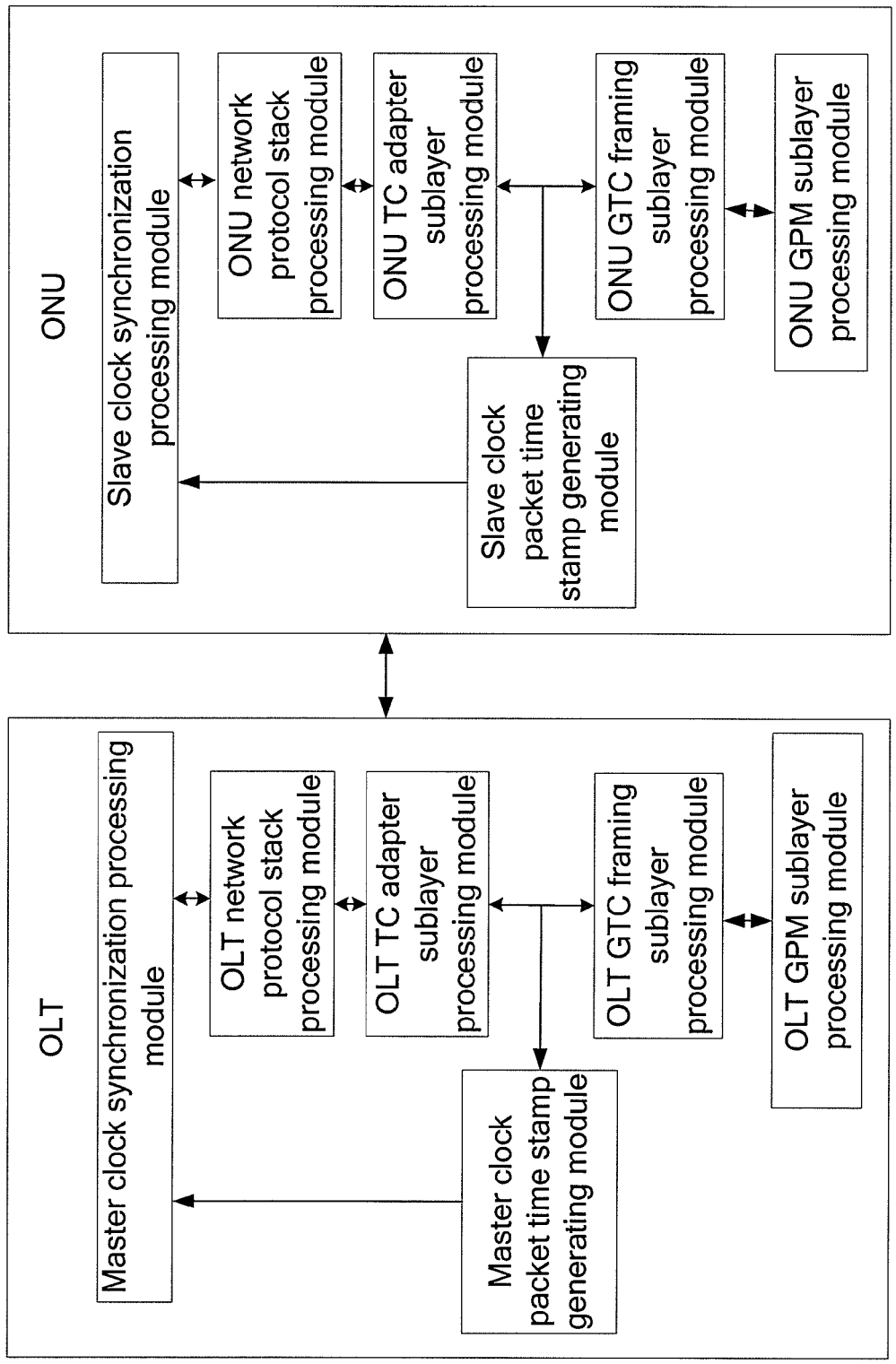
FIG. 22 illustrates a second application of an optical communications system according to an embodiment of the present invention.

FIG. 22 illustrates a second application of the optical communications system according to the embodiment of the present invention, where the first, second, third, and fourth clock packets are carried over an Ethernet protocol. FIG. 22 differs from FIG. 21 in that: on the master clock side, the master clock packet time stamp generating module is configured to determine the master clock packet time stamp generating point according to the GEM frame header at the TC adapter sub-layer; on the slave clock side, the slave clock packet time stamp generating module is configured to determine the slave clock packet time stamp generating point according to the GEM frame header at the TC adapter sub-layer.

Figure 23:
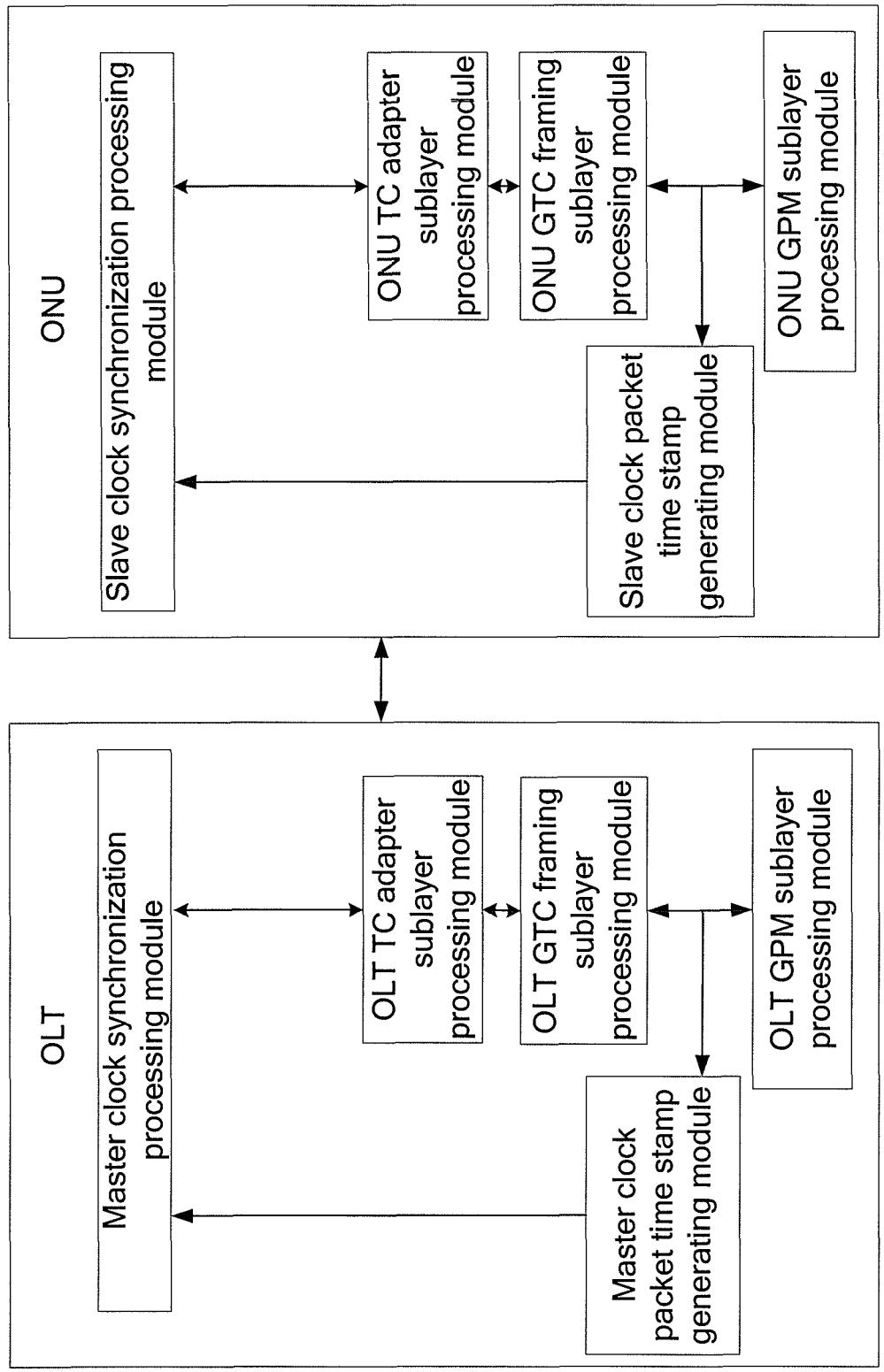
FIG. 23 illustrates a third application of an optical communications system according to an embodiment of the present invention.

FIG. 23 illustrates a third application of the optical communications system according to the embodiment of the present invention. The first, second, third, and fourth clock packet are carried in IEEE 1588/1588v2 over GEM mode. On the master clock side, the OLT includes a master clock packet time stamp generating module, a master clock synchronization processing module, an OLT GPM sub-layer processing module, an OLT GTC framing sub-layer processing module, and an OLT TC adapter sub-layer processing module. The master clock packet time stamp generating module is configured to determine the position of the master clock packet time stamp generating point and generate time stamp information according to the GTC TC frame header at the GTC framing sub-layer. The ONU includes a slave clock packet time stamp generating module, a slave clock synchronization processing module, an ONU GPM sub-layer processing module, an ONU GTC framing sub-layer processing module, and an ONU TC adapter sub-layer processing module. The slave clock packet time stamp generating module is configured to determine the position of the slave clock packet time stamp generating point and generate time stamp information according to the GTC TC frame header at the GTC framing sub-layer.

Figure 24:
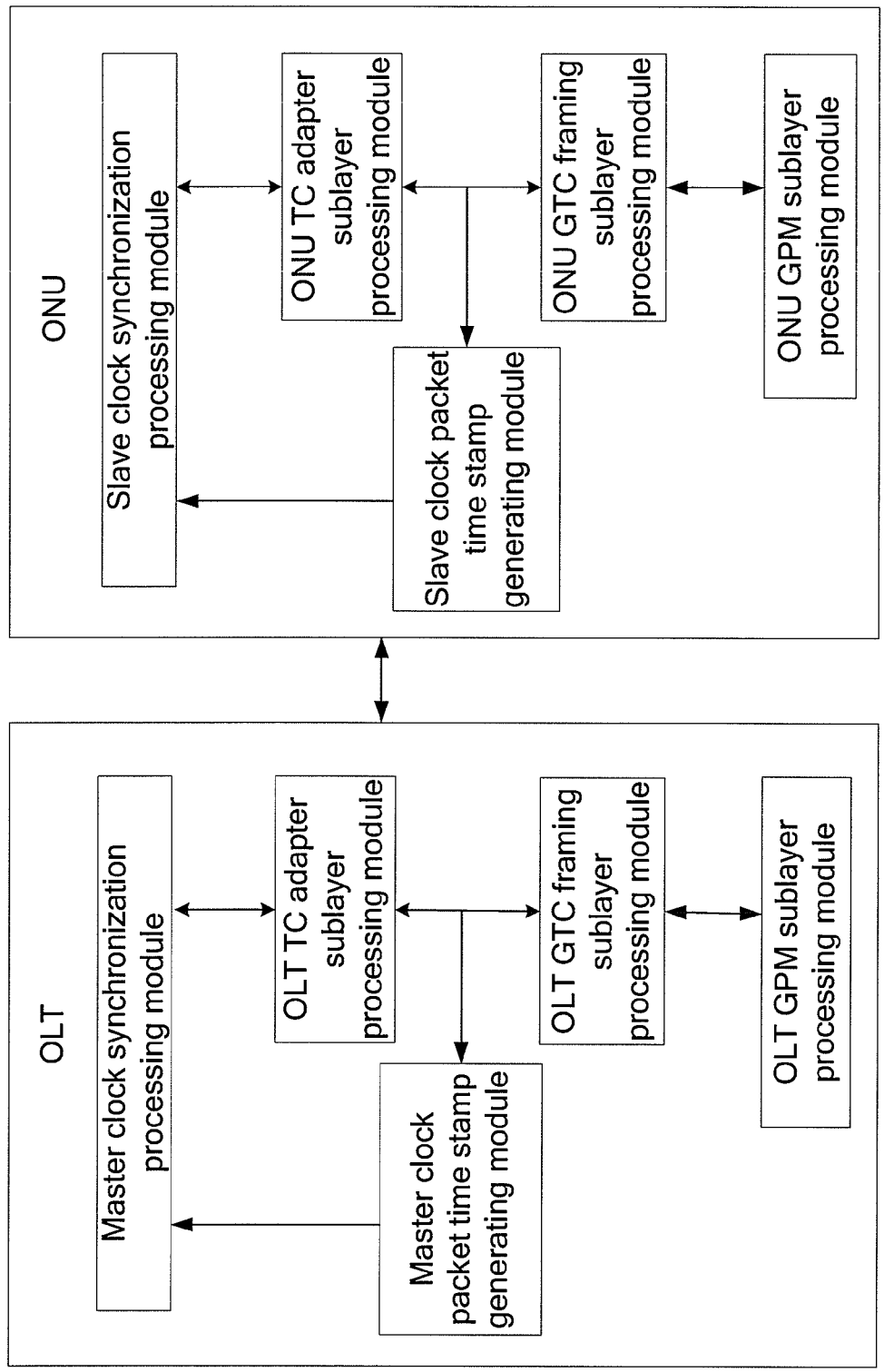
FIG. 24 illustrates a fourth application of an optical communications system according to an embodiment of the present invention.

FIG. 24 illustrates a fourth application of the optical communications system according to the embodiment of the present invention, where the first, second, third, and fourth clock packets are carried in IEEE 1588/1588v2 over GEM mode. FIG. 24 differs from FIG. 23 in that: on the master clock side, the master clock packet time stamp generating module is configured to determine the master clock packet time stamp generating point according to the GEM frame header at the TC adapter sub-layer; on the slave clock side, the slave clock packet time stamp generating module is configured to determine the slave clock packet time stamp generating point according to the GEM frame header at the TC adapter sub-layer.

Figure 25:
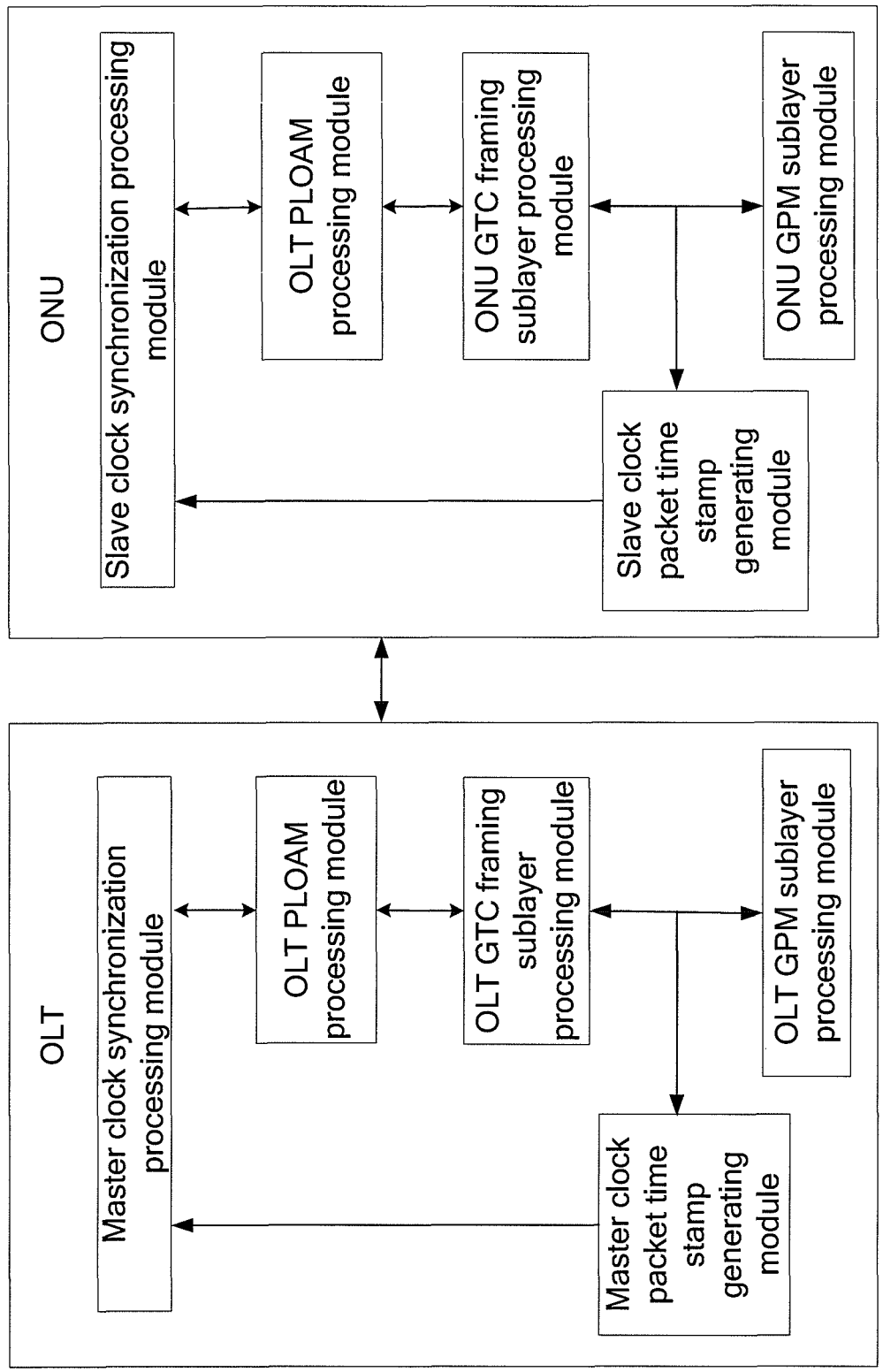
FIG. 25 illustrates a fifth application of an optical communications system according to an embodiment of the present invention.

FIG. 25 illustrates a fifth application of the optical communications system according to the embodiment of the present invention, where the clock packets are carried in PLOAM messages. On the master clock side, the OLT includes a master clock packet time stamp generating module, a master clock synchronization processing module, an OLT PLOAM processing module, an OLT GPM sub-layer processing module, and an OLT GTC framing sub-layer processing module. The master clock packet time stamp generating module is configured to determine the position of the master clock packet time stamp generating point and generate time stamp information according to the GTC TC frame header at the GTC framing sub-layer. On the slave clock side, the ONU includes a slave clock packet time stamp generating module, a slave clock synchronization processing module, an ONU PLOAM processing module, an ONU GPM sub-layer processing module, and an ONU GTC framing sub-layer processing module. The slave clock packet time stamp generating module is configured to determine the position of the slave clock packet time stamp generating point and generate time stamp information according to the GTC TC frame header at the GTC framing sub-layer.

Figure 26:
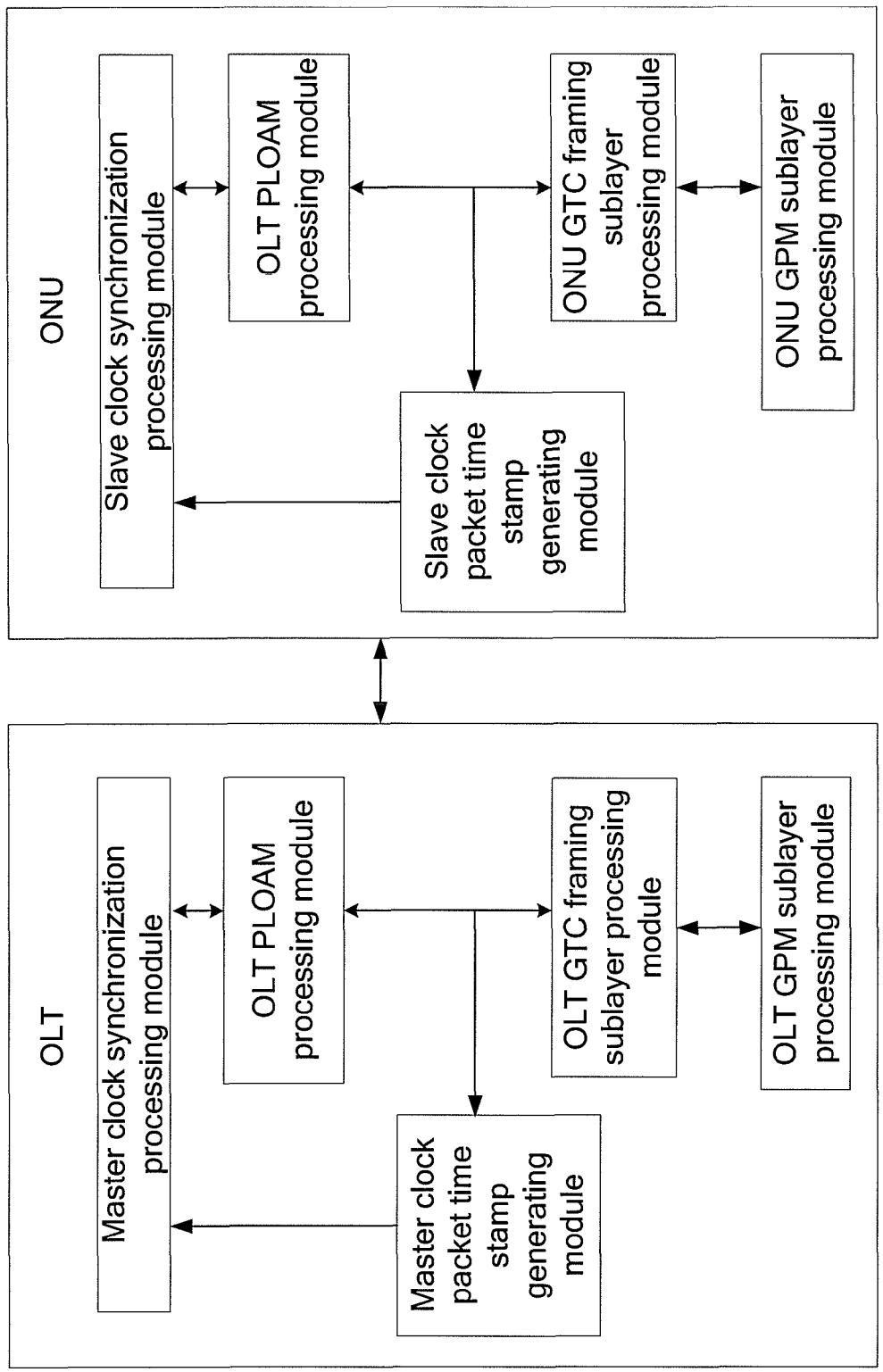
FIG. 26 illustrates a sixth application of an optical communications system according to an embodiment of the present invention.

FIG. 26 illustrates a sixth application of the optical communications system according to the embodiment of the present invention, where the clock packets are carried in PLOAM messages. FIG. 26 is different from FIG. 25 in that: On the master clock side, the master clock packet time stamp generating module is configured to determine the master clock packet time stamp generating point according to the GEM frame header at the TC adapter sub-layer; on the slave clock side, the slave clock packet time stamp generating module is configured to determine the slave clock packet time stamp generating point according to the GEM frame header at the TC adapter sub-layer.

Figure 27:
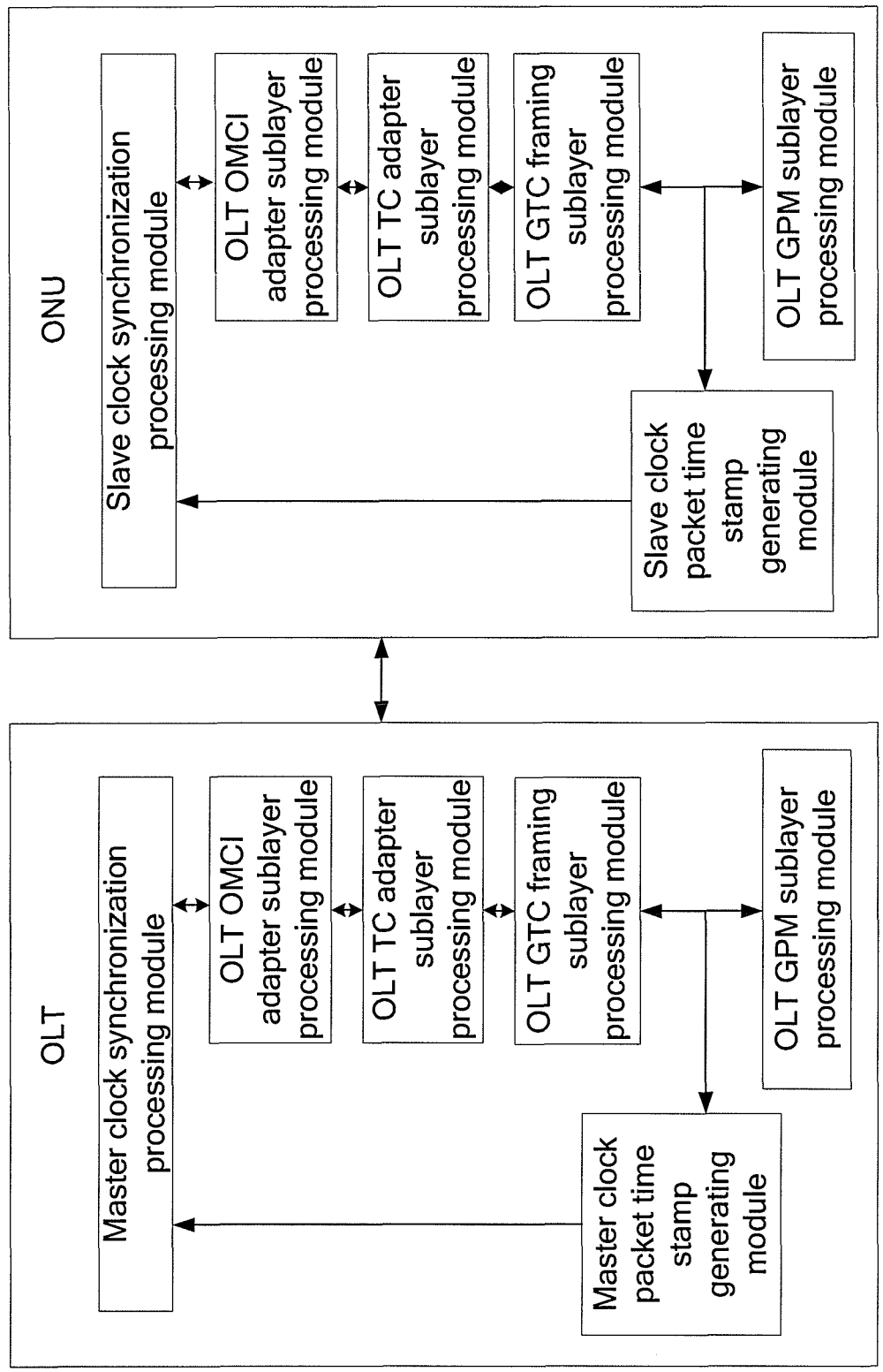
FIG. 27 illustrates a seventh application of an optical communications system according to an embodiment of the present invention.

FIG. 27 illustrates a seventh application of the optical communications system according to the embodiment of the present invention, where the clock packets are carried in OMCI messages. On the master clock side, the OLT includes a master clock packet time stamp generating module, a master clock synchronization processing module, an OLT GPM sub-layer processing module, an OLT GTC framing sub-layer processing module, an OLT TC adapter sub-layer processing module, and an OLT OMCI adapter sub-layer processing module. The master clock packet time stamp generating module is configured to determine the position of the master clock packet time stamp generating point and generate time stamp information according to the GTC TC frame header at the GTC framing sub-layer. On the slave clock side, the ONU includes a slave clock packet time stamp generating module, a slave clock synchronization processing module, an ONU GPM sub-layer processing module, an ONU GTC framing sub-layer processing module, an ONU TC adapter sub-layer processing module, and an ONU OMCI adapter sub-layer processing module. The slave clock packet time stamp generating module is configured to determine the position of the slave clock packet time stamp generating point and generate time stamp information according to the GTC TC frame header at the GTC framing sub-layer.

Figure 28:
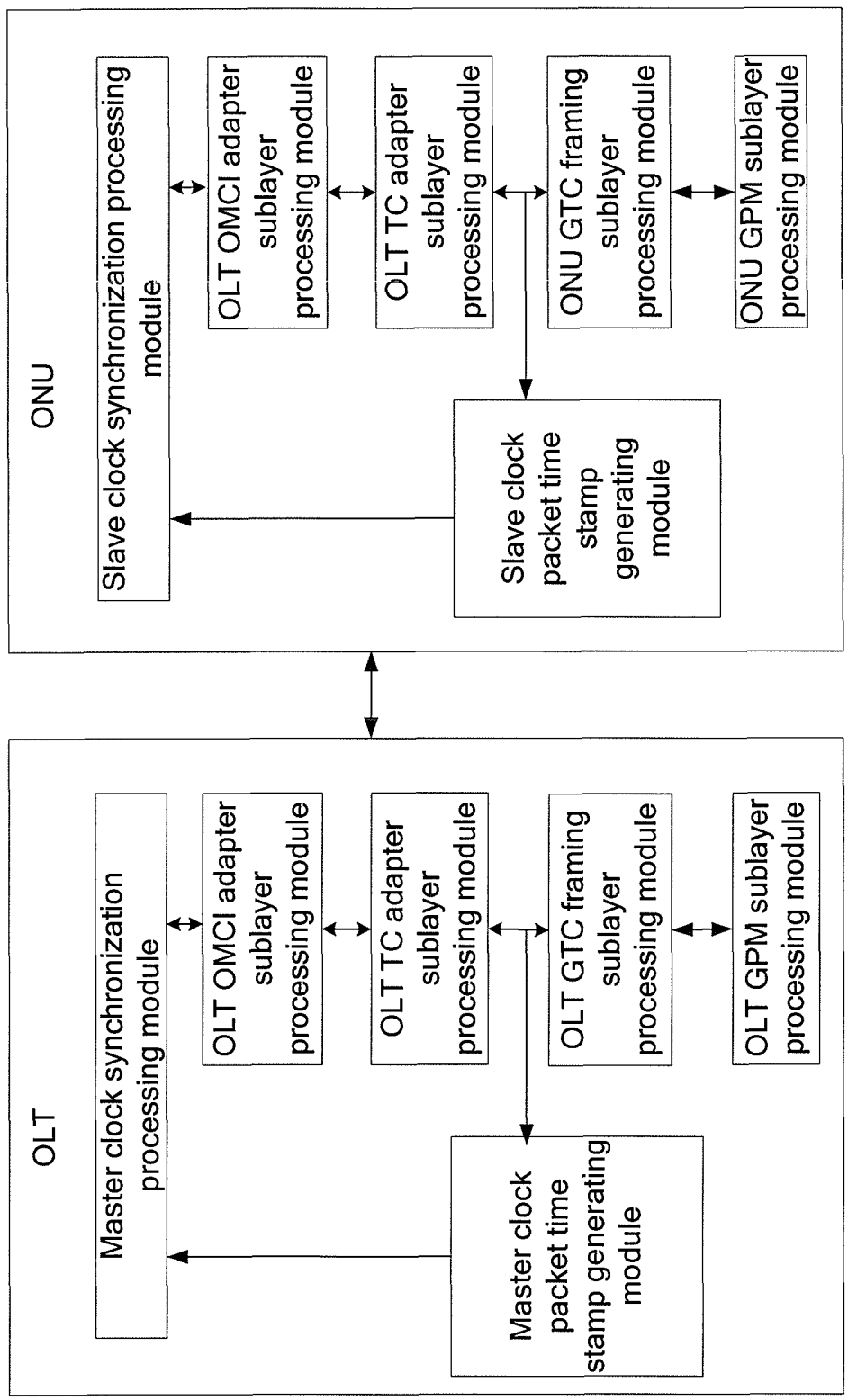
FIG. 28 illustrates an eighth application of an optical communications system according to an embodiment of the present invention.

FIG. 28 illustrates an eighth application of the optical communications system according to the embodiment of the present invention, where the clock packets are carried in OMCI messages. FIG. 28 differs from FIG. 27 in that: At the master clock side, the master clock packet time stamp generating module is configured to determine the master clock packet time stamp generating point according to the GEM frame header at the TC adapter sub-layer; on the slave clock side, the slave clock packet time stamp generating module is configured to determine the slave clock packet time stamp generating point according to the GEM frame header at the TC adapter sub-layer.

Those skilled in the art understand that the synchronization method, optical network device, and optical communications system according to the embodiments of the present invention are applicable not only to GPON systems but also to other xPON systems.

Through the descriptions of the preceding embodiments, those skilled in the art may understand that the present invention may be implemented by hardware only or by software and necessary universal hardware. However, in most cases, software and necessary universal hardware are preferred. Based on such understandings, all or part of the technical solution under the present invention that makes contributions to the prior art may be essentially embodied in the form of a software product. The software product may be stored in a storage medium. The software product includes a number of instructions that enable a computer device (mobile phone, personal computer, server, or network device) to execute the methods provided in the embodiments of the present invention.

The above descriptions are merely some exemplary embodiments of the present invention, but not desired to limit the scope of the present invention. Any modification, replacement, or improvement made without departing from the spirit and principle of the present invention should fall within the scope of the present invention.

What is claimed is:

1. A method for synchronizing time in a Passive Optical Network (PON), the method comprising:
    generating a Passive Optical Network (PON) downstream frame from an Optical Line Terminal (OLT) to an Optical Network Unit (ONU), wherein the PON downstream frame comprises a time synchronization message based on Ethernet protocol, wherein the time synchronization message comprises a time value that is referenced to a PON Media Access Control (MAC) control layer and that indicates the ONU to adjust a time of a clock coupled to the ONU;
    sending the PON downstream frame.

2. The method of claim 1, wherein the PON MAC control layer is Transmission Convergence Adapter Sub-layer.

3. The method of claim 1, wherein the time synchronization message is based on IEEE 1588 protocol.

4. The method of claim 1, wherein the time value is relative to a certain bit in a Physical Control Block downstream (PCBd) field of the PON downstream frame.

5. A method for synchronizing time in a Passive Optical Network (PON), the method comprising:
    receiving a Passive Optical Network (PON) downstream frame from an Optical Line Terminal (OLT) to an Optical Network Unit (ONU), wherein the PON downstream frame comprises a time synchronization message based on Ethernet protocol, wherein the time synchronization message comprises a time value that is referenced to a PON Media Access Control (MAC) control layer and that indicates the ONU to adjust a time of a clock coupled to the ONU;
    acquiring the time value from the time synchronization message in the PON downstream frame; and
    adjusting the time of the clock coupled to the ONU based on the time value.

6. The method of claim 5, wherein the PON MAC control layer is Transmission Convergence Adapter Sub-layer.

7. The method of claim 5, wherein the time synchronization message is based on IEEE 1588 protocol.

8. The method of claim 5, wherein the time value is relative to a certain bit in a Physical Control Block downstream (PCBd) field of the PON downstream frame.

9. An apparatus in a passive optical network, the apparatus comprising a processor configured to:
    generate a Passive Optical Network (PON) downstream frame from an Optical Line Terminal (OLT) to an Optical Network Unit (ONU), wherein the PON downstream frame comprises a time synchronization message based on Ethernet protocol, wherein the time synchronization message comprises a time value that is referenced to a PON Media Access Control (MAC) control layer and that indicates the ONU to adjust a time of a clock coupled to the ONU; and
    send the PON downstream frame.

10. The apparatus of claim 9, wherein the PON MAC control layer is Transmission Convergence Adapter Sub-layer.

11. The apparatus of claim 9, wherein the time synchronization message is based on IEEE 1588 protocol.

12. The apparatus of claim 9, wherein the time value is relative to a certain bit in a Physical Control Block downstream (PCBd) field of the PON downstream frame.

13. An apparatus in a passive optical network, the apparatus comprising a processor configured to:
    receive a Passive Optical Network (PON) downstream frame from an Optical Line Terminal (OLT) to an Optical Network Unit (ONU), wherein the PON downstream frame comprises a time synchronization message based on Ethernet protocol, wherein the time synchronization message comprises a time value that is referenced to a PON Media Access Control (MAC) control layer and that indicates the ONU to adjust a time of a clock coupled to the ONU;
    acquire the time value from the time synchronization message in the PON downstream frame; and
    adjust the time of the clock coupled to the ONU based on the time value.

14. The apparatus of claim 13, wherein the PON MAC control layer is Transmission Convergence Adapter Sub-layer.

15. The apparatus of claim 13, wherein the time synchronization message is based on IEEE 1588 protocol.

16. The apparatus of claim 13, wherein the time value is relative to a certain bit in a Physical Control Block downstream (PCBd) field of the PON downstream frame.

17. A Passive Optical Network (PON) system, comprising:
    an Optical Line Terminal (OLT);
    an Optical Network Unit (ONU);
    wherein the OLT is configured to:
        generate a PON downstream frame comprising a time synchronization message based on Ethernet protocol, wherein the time synchronization message comprises a time value that is referenced to a PON Media Access Control (MAC) control layer and indicates the ONU to adjust a time of a clock coupled to the ONU, and
        send the PON downstream frame to the ONU; and
    wherein the ONU is configured to receive the PON downstream frame, and adjust the time of the clock based on the time value acquired from the PON downstream frame.

18. The PON system of claim 17, wherein the PON MAC control layer is Transmission Convergence Adapter Sub-layer.

19. The PON system of claim 17, wherein the time synchronization message is based on IEEE 1588 protocol.

20. The PON system of claim 17, wherein the time value is relative to a certain bit in a Physical Control Block downstream (PCBd) field of the PON downstream frame.

* * * * *